US011025772B2

United States Patent
Cheong et al.

(10) Patent No.: US 11,025,772 B2
(45) Date of Patent: Jun. 1, 2021

(54) METHOD FOR SHARING BLUETOOTH COMMUNICATION INFORMATION AND ELECTRONIC DEVICE THEREFOR

(71) Applicant: Samsung Electronics Co., Ltd., Gyeonggi-do (KR)

(72) Inventors: Gupil Cheong, Gyeonggi-do (KR); Euibum Han, Gyeonggi-do (KR); Gibeom Kim, Gyeonggi-do (KR); Hyunah Oh, Gyeonggi-do (KR); Sungjun Choi, Gyeonggi-do (KR); Dayton Kim, Gyeonggi-do (KR); Jesus Manuel Perez Pueyo, Gyeonggi-do (KR); Hyunseok Kim, Gyeonggi-do (KR); Soohye Shin, Gyeonggi-do (KR); Doosuk Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/783,602

(22) Filed: Feb. 6, 2020

(65) Prior Publication Data
US 2020/0259950 A1 Aug. 13, 2020

(30) Foreign Application Priority Data
Feb. 12, 2019 (KR) .................. 10-2019-0016150

(51) Int. Cl.
*H04M 1/72472* (2021.01)
*H04W 76/14* (2018.01)
(Continued)

(52) U.S. Cl.
CPC ......... *H04M 1/72472* (2021.01); *H04W 4/80* (2018.02); *H04W 8/005* (2013.01);
(Continued)

(58) Field of Classification Search
CPC ............. H04M 1/725; H04M 1/72586; H04M 2250/02; H04W 16/18; H04W 4/80;
(Continued)

(56) References Cited

U.S. PATENT DOCUMENTS

| 8,391,787 B2 | 3/2013 | Kim |
| 9,125,002 B2 | 9/2015 | Park |

(Continued)

FOREIGN PATENT DOCUMENTS

| KR | 10-2008-0069836 A | 7/2008 |
| KR | 10-2010-0076588 A | 7/2010 |

(Continued)

OTHER PUBLICATIONS

International Search Report dated Jun. 10, 2020.

*Primary Examiner* — Thanh C Le
(74) *Attorney, Agent, or Firm* — Cha & Reiter, LLC.

(57) ABSTRACT

An electronic device is provided to include a user interface, a communication circuitry that supports Bluetooth (BT) communication and store a first BT address, a processor operatively connected with the user interface and the communication circuitry, and a memory operatively connected with the processor. The memory stores instructions that, when executed, cause the processor to establish a communication connection with a first external electronic device based on the first BT address, end the communication connection with the first external electronic device, receive a reconnection request based on the first BT address from the first external electronic device, transmit a communication connection request to the first external electronic device based on a second BT address different from the first BT address, using the communication circuitry in response to the reconnection request, and store information about whether the first external electronic device accepts or (Continued)

declines the communication connection request in the memory.

14 Claims, 23 Drawing Sheets

(51) Int. Cl.
   *H04W 4/80* (2018.01)
   *H04W 76/11* (2018.01)
   *H04W 8/00* (2009.01)

(52) U.S. Cl.
   CPC ............ *H04W 76/11* (2018.02); *H04W 76/14* (2018.02); *H04M 2250/02* (2013.01)

(58) Field of Classification Search
   CPC ..... H04W 76/11; H04W 76/14; H04W 8/005; H04W 84/042
   See application file for complete search history.

(56) References Cited

U.S. PATENT DOCUMENTS

| | | |
|---|---|---|
| 9,445,032 B2 | 9/2016 | Muth |
| 10,645,559 B2 | 5/2020 | Li et al. |
| 2009/0156123 A1 | 6/2009 | Kim |
| 2014/0155031 A1* | 6/2014 | Lee ........................ H04W 12/08 455/411 |
| 2015/0103708 A1* | 4/2015 | Kang ................ H04W 52/0235 370/311 |
| 2015/0271432 A1 | 9/2015 | Muth |
| 2018/0206276 A1* | 7/2018 | Chien ..................... H04W 4/80 |
| 2018/0376528 A1 | 12/2018 | Lee et al. |
| 2019/0253857 A1 | 8/2019 | Li et al. |
| 2020/0382951 A1* | 12/2020 | Lee ........................ H04W 4/80 |

FOREIGN PATENT DOCUMENTS

| | | |
|---|---|---|
| KR | 10-2013-0029912 A | 3/2013 |
| KR | 10-1364540 B1 | 2/2014 |
| KR | 10-1566339 B1 | 11/2015 |
| KR | 10-20170140363 A | 12/2017 |
| KR | 10-2019-0001468 A | 1/2019 |
| WO | 2018/000134 A1 | 1/2018 |

* cited by examiner

METHOD FOR SHARING BLUETOOTH COMMUNICATION INFORMATION AND ELECTRONIC DEVICE THEREFOR

CROSS-REFERENCE TO RELATED APPLICATION(S)

This application is based on and claims priority under 35 U.S.C. § 119 to Korean Patent Application No. 10-2019-0016150, filed on Feb. 12, 2019, in the Korean Intellectual Property Office, the disclosure of which is incorporated by reference herein its entirety.

BACKGROUND

1. Field

The instant disclosure generally relates to technologies for sharing Bluetooth (BT) communication information.

2. Description of Related Art

An electronic device may establish BT communication with an external electronic device by sequentially executing an inquiry process, a paging process, and a pairing process. In this case, the electronic device and the external electronic device may not have a history of previous BT communications. The electronic device may store information associated with the external electronic device (e.g., at least a part of a unique address of the external electronic device), obtained in the inquiry process, and may then establish BT communication with the external electronic device via the paging process and the pairing process using the information associated with the external electronic device.

The electronic device may share information about at least one first external electronic device (e.g., a BT address of the first external electronic device), which has a history of established BT communication with the electronic device, with a second external electronic device which does not have a history of established BT communication with the first external electronic device. In this case, the second external electronic device may establish BT communication with the first external electronic device without the inquiry process using the information about the first external electronic device transmitted from the electronic device.

The above information is presented as background information only to assist with an understanding of the present disclosure. No determination has been made, and no assertion is made, as to whether any of the above might be applicable as prior art with regard to the present disclosure.

SUMMARY

There may be a case in which a first external electronic device may refuse a BT communication connection request from a second external electronic device whose address the first external electronic device does not know, i.e. when the first external electronic device and the second external electronic device have no previous BT communication history. In such a case, the second external electronic device cannot perform BT communication with the first external electronic device using information about the first external electronic device shared from another electronic device, e.g. the aforementioned electronic device. Instead, the second external electronic device may have to perform an inquiry process in order to receive a unique address of the first external electronic device from the first external electronic device, and only after this process may the second external electronic device establish BT communication with the first external electronic device. In this case, the time and load for establishing BT communication may increase, compared to the scenario when the second external electronic device uses the information about the first external electronic device shared from the electronic device.

In accordance with an aspect of the disclosure, an electronic device is provided. The electronic device may include a user interface, a communication circuitry configured to support Bluetooth (BT) communication and to store a first BT address, a processor operatively connected with the user interface and the communication circuitry, and a memory operatively connected with the processor. The memory may store instructions that, when executed, cause the processor to establish a communication connection with a first external electronic device based on the first BT address, using the communication circuitry, end the communication connection with the first external electronic device, receive a reconnection request based on the first BT address from the first external electronic device, after ending the communication connection, transmit a communication connection request to the first external electronic device based on a second BT address different from the first BT address, using the communication circuitry in response to the reconnection request, and store information about whether the first external electronic device accepts or declines the communication connection request in the memory.

In accordance with another aspect of the disclosure, an electronic device is provided. The electronic device may include a user interface, at least one communication circuitry configured to support Bluetooth (BT) communication, a processor operatively connected with the user interface and the at least one communication circuitry, and a memory operatively connected with the processor. The memory may include instructions that, when executed, cause the processor to receive first information about at least one second external electronic device with which a first external electronic device is connected through BT communication and second information about a probability that the at least one second external electronic device will accept a connection request using an address for which there is no connection history, using the at least one communication circuitry and provide the second information through the user interface.

In accordance with another aspect of the disclosure, an electronic device is provided. The electronic device may include a user interface, a communication circuitry configured to support Bluetooth (BT) communication and to store a first BT address, a processor operatively connected with the user interface and the communication circuitry, and a memory operatively connected with the processor. The memory may store instructions that, when executed, cause the processor to establish a communication connection with a first external electronic device based on the first BT address, using the communication circuitry, transmit a communication connection request to the first external electronic device based on a second BT address different from the first BT address, using the communication circuitry, after the communication connection is established, and store information about whether the first external electronic device accepts or declines the communication connection request based on the second BT address in the memory.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Aspects of the disclosure are to address at least the above-mentioned problems and/or disadvantages and to provide at least the advantages described below. Accordingly, an aspect of the disclosure is to provide a method for sharing Bluetooth (BT) communication information to configure BT communication. The communication information may include information indicating whether an external electronic device is able to perform BT communication based on a BT address of an electronic device for which there is no history of established BT communication.

Figure 1A:
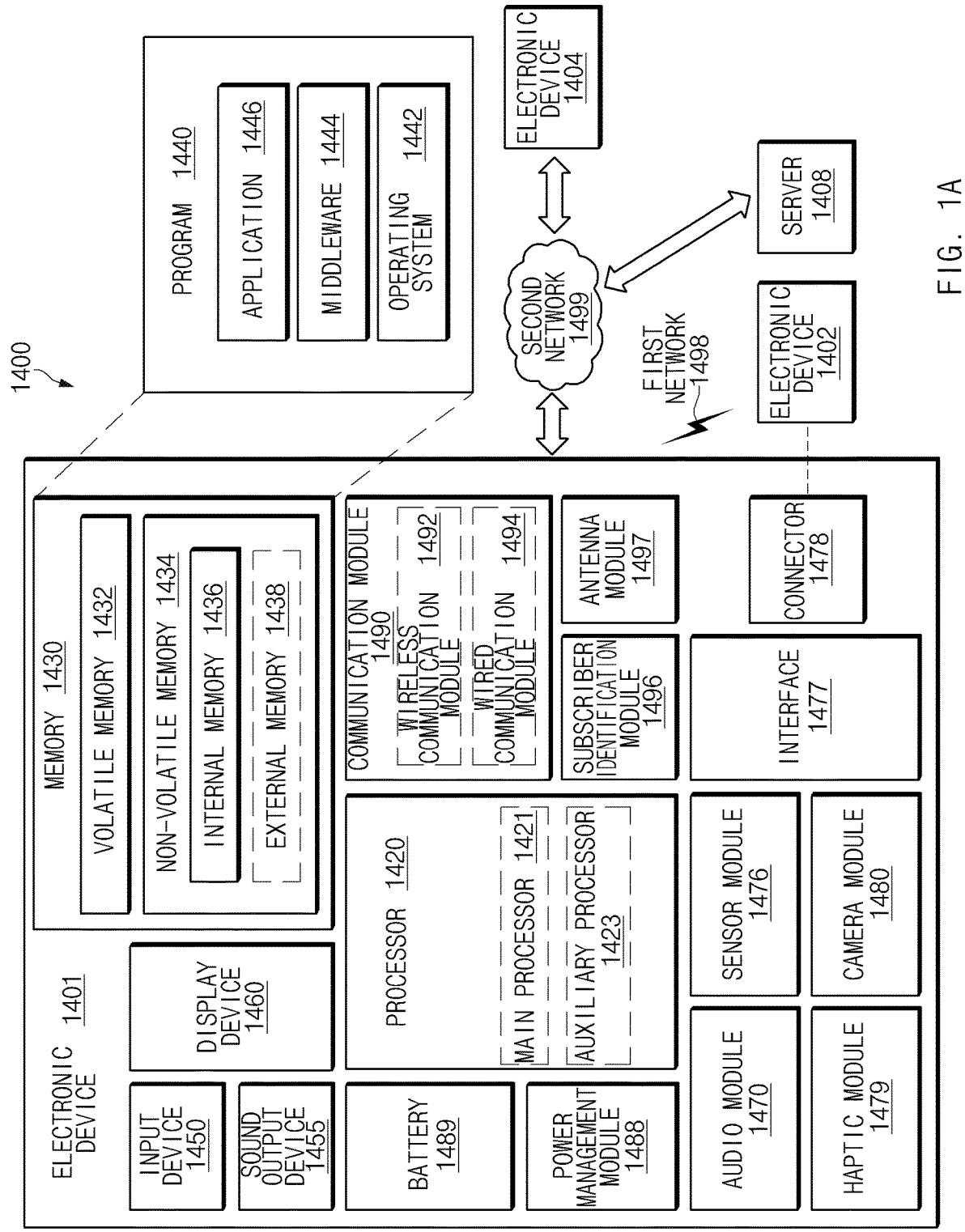
FIG. 1A is a block diagram illustrating an electronic device in a network environment according to various embodiments.

FIG. 1A is a block diagram illustrating an electronic device 1401 in a network environment 1400 according to various embodiments. Referring to FIG. 1A, the electronic device 1401 in the network environment 1400 may communicate with an electronic device 1402 via a first network 1498 (e.g., a short-range wireless communication network), or an electronic device 1404 or a server 1408 via a second network 1499 (e.g., a long-range wireless communication network). According to an embodiment, the electronic device 1401 may communicate with the electronic device 1404 via the server 1408. According to an embodiment, the electronic device 1401 may include a processor 1420, memory 1430, an input device 1450, a sound output device 1455, a display device 1460, an audio module 1470, a sensor module 1476, an interface 1477, a haptic module 1479, a camera module 1480, a power management module 1488, a battery 1489, a communication module 1490, a subscriber identification module (SIM) 1496, or an antenna module 1497. In some embodiments, at least one (e.g., the display device 1460 or the camera module 1480) of the components may be omitted from the electronic device 1401, or one or more other components may be added in the electronic device 1401. In some embodiments, some of the components may be implemented as single integrated circuitry. For example, the sensor module 1476 (e.g., a fingerprint sensor, an iris sensor, or an illuminance sensor) may be implemented as embedded in the display device 1460 (e.g., a display).

The processor 1420 may execute, for example, software (e.g., a program 1140) to control at least one other component (e.g., a hardware or software component) of the electronic device 1401 coupled with the processor 1420, and may perform various data processing or computation. According to one embodiment, as at least part of the data processing or computation, the processor 1420 may load a command or data received from another component (e.g., the sensor module 1476 or the communication module 1490) in volatile memory 1432, process the command or the data stored in the volatile memory 1432, and store resulting data in non-volatile memory 1434. According to an embodiment, the processor 1420 may include a main processor 1421 (e.g., a central processing unit (CPU) or an application processor (AP)), and an auxiliary processor 1423 (e.g., a graphics processing unit (GPU), an image signal processor (ISP), a sensor hub processor, or a communication processor (CP)) that is operable independently from, or in conjunction with, the main processor 1421. Additionally or alternatively, the auxiliary processor 1423 may be adapted to consume less power than the main processor 1421, or to be specific to a specified function. The auxiliary processor 1423 may be implemented as separate from, or as part of the main processor 1421.

The auxiliary processor 1423 may control at least some of functions or states related to at least one component (e.g., the display device 1460, the sensor module 1476, or the communication module 1490) among the components of the electronic device 1401, instead of the main processor 1421 while the main processor 1421 is in an inactive (e.g., sleep) state, or together with the main processor 1421 while the main processor 1421 is in an active state (e.g., executing an application). According to an embodiment, the auxiliary processor 1423 (e.g., an image signal processor or a communication processor) may be implemented as part of another component (e.g., the camera module 1480 or the communication module 1490) functionally related to the auxiliary processor 1423.

The memory 1430 may store various data used by at least one component (e.g., the processor 1420 or the sensor module 1476) of the electronic device 1401. The various data may include, for example, software (e.g., the program 1440) and input data or output data for a command related thereto. The memory 1430 may include the volatile memory 1432 or the non-volatile memory 1434.

The program 1440 may be stored in the memory 1430 as software, and may include, for example, an operating system (OS) 1442, middleware 1444, or an application 1446.

The input device 1450 may receive a command or data to be used by other component (e.g., the processor 1420) of the electronic device 1401, from the outside (e.g., a user) of the electronic device 1401. The input device 1450 may include, for example, a microphone, a mouse, a keyboard, or a digital pen (e.g., a stylus pen).

The sound output device 1455 may output sound signals to the outside of the electronic device 1401. The sound output device 1455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1460 may visually provide information to the outside (e.g., a user) of the electronic device 1401. The display device 1460 may include, for example, a display, a hologram device, or a projector and control circuitry to control a corresponding one of the display, hologram device, and projector. According to an embodiment, the display device 1460 may include touch circuitry adapted to detect a touch, or sensor circuitry (e.g., a pressure sensor) adapted to measure the intensity of force incurred by the touch.

The audio module 1470 may convert a sound into an electrical signal and vice versa. According to an embodiment, the audio module 1470 may obtain the sound via the input device 1450, or output the sound via the sound output device 1455 or a headphone of an external electronic device (e.g., an electronic device 1402) directly (e.g., wiredly) or wirelessly coupled with the electronic device 1401.

The sensor module 1476 may detect an operational state (e.g., power or temperature) of the electronic device 1401 or an environmental state (e.g., a state of a user) external to the electronic device 1401, and then generate an electrical signal or data value corresponding to the detected state. According to an embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1477 may support one or more specified protocols to be used for the electronic device 1101 to be coupled with the external electronic device (e.g., the electronic device 1402) directly (e.g., wiredly) or wirelessly. According to an embodiment, the interface 1477 may include, for example, a high definition multimedia interface (HDMI), a universal serial bus (USB) interface, a secure digital (SD) card interface, or an audio interface.

A connecting terminal 1478 may include a connector via which the electronic device 1101 may be physically connected with the external electronic device (e.g., the electronic device 1402). According to an embodiment, the connecting terminal 1478 may include, for example, a HDMI connector, a USB connector, a SD card connector, or an audio connector (e.g., a headphone connector).

The haptic module 1479 may convert an electrical signal into a mechanical stimulus (e.g., a vibration or a movement) or electrical stimulus which may be recognized by a user via his tactile sensation or kinesthetic sensation. According to an embodiment, the haptic module 1479 may include, for example, a motor, a piezoelectric element, or an electric stimulator.

The camera module 1480 may capture a still image or moving images. According to an embodiment, the camera module 1480 may include one or more lenses, image sensors, image signal processors, or flashes.

The power management module 1488 may manage power supplied to the electronic device 1401. According to one embodiment, the power management module 1488 may be implemented as at least part of, for example, a power management integrated circuit (PMIC).

The battery 1489 may supply power to at least one component of the electronic device 1401. According to an embodiment, the battery 1489 may include, for example, a primary cell which is not rechargeable, a secondary cell which is rechargeable, or a fuel cell.

The communication module 1490 may support establishing a direct (e.g., wired) communication channel or a wireless communication channel between the electronic device 1401 and the external electronic device (e.g., the electronic device 1402, the electronic device 1404, or the server 1408) and performing communication via the established communication channel. The communication module 1490 may include one or more communication processors that are operable independently from the processor 1420 (e.g., the application processor (AP)) and supports a direct (e.g., wired) communication or a wireless communication. According to an embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device via the first network 1498 (e.g., a short-range communication network, such as Bluetooth™, wireless-fidelity (Wi-Fi) direct, or infrared data association (IrDA)) or the second network 1499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the subscriber identification module 1496.

The antenna module 1497 may transmit or receive a signal or power to or from the outside (e.g., the external electronic device) of the electronic device 1401. According to an embodiment, the antenna module 1497 may include an antenna including a radiating element composed of a conductive material or a conductive pattern formed in or on a substrate (e.g., PCB). According to an embodiment, the antenna module 1497 may include a plurality of antennas. In such a case, at least one antenna appropriate for a communication scheme used in the communication network, such as the first network 1498 or the second network 1499, may be selected, for example, by the communication module 1490 (e.g., the wireless communication module 1492) from the plurality of antennas. The signal or the power may then be transmitted or received between the communication module 1490 and the external electronic device via the selected at least one antenna. According to an embodiment, another component (e.g., a radio frequency integrated circuit (RFIC)) other than the radiating element may be additionally formed as part of the antenna module 1497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1401 and the external electronic device 1404 via the server 1408 coupled with the second network 1499. Each of the electronic devices 1402 and 1404 may be a device of a same type as, or a different type, from the electronic device 1401. According to an embodiment, all or some of operations to be executed at the electronic device 1401 may be executed at one or more of the external electronic devices 1402, 1404, or 1408. For example, if the electronic device 1401 should perform a function or a service automatically, or in response to a request from a user or another device, the electronic device 1401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1401. The electronic device 1401 may provide the outcome, with or without further processing of the outcome, as at least part of a reply to the request. To that end, a cloud computing, distributed computing, or client-server computing technology may be used, for example.

Figure 1B:
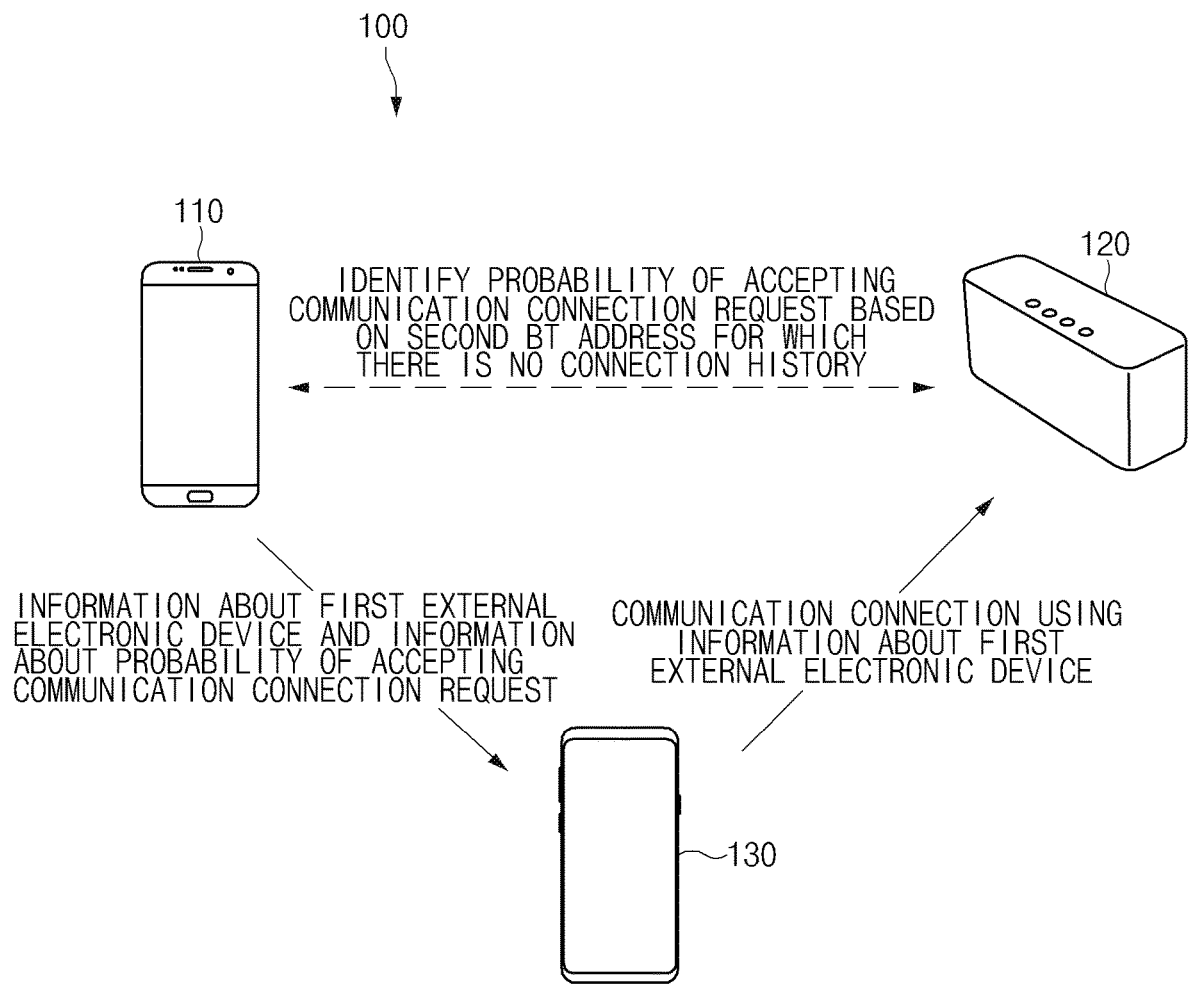
FIG. 1B is a drawing illustrating a BT communication system according to an embodiment.

FIG. 1B is a drawing illustrating a BT communication system according to an embodiment.

Referring to FIG. 1B, a BT communication system 100 according to an embodiment may include an electronic device 110 (e.g., the electronic device 1401 of FIG. 1A), a first external electronic device 120 (e.g., the electronic device 1402 of FIG. 1A), and a second external electronic device 130 (e.g., the electronic device 1404 of FIG. 1A).

When there is no history of established BT communication with the first external electronic device 120, the electronic device 110 may establish BT communication with the first external electronic device 120 through an inquiry process, a paging process, and a pairing process based on a first BT address. The electronic device 120 may store first information about the first external electronic device 120, obtained in the inquiry process, in its memory and may then establish BT communication with the first external electronic device 120 in addition to the inquiry process. The first information about the first external electronic device 120 may include, for example, the BT address of the first external electronic device 120 and the name of the first external electronic device 120. The first BT address may be a unique address of the electronic device 110 for BT communication. The BT address of the first external electronic device 120 may be a unique address of the first external electronic device 120 for BT communication.

According to an embodiment, after establishing the communication based on the first BT address with the first external electronic device 120, the electronic device 110 may transmit a communication connection request to the first external electronic device 120 based on a second BT address different from the first BT address and may identify whether the first external electronic device 120 accepts or declines the communication connection request. The second BT address may be, for example, a BT address for which there is no history of established communication with the first external electronic device 120. The electronic device 110 may identify that the first external electronic device 120 accepts or declines the communication connection request based on the second BT address and may store second information about the possibility that the first external electronic device 120 will accept the communication connection request (information about that the first external electronic device 120 accepts or declines the communication connection request) in the memory. For example, the electronic device 110 may associate and store the first information about the first external electronic device 120 (e.g., the Bluetooth address and/or the name) with the second information about the possibility that the first external electronic device 120 will accept the communication connection request in the memory. The second information about the possibility that the first external electronic device 120 will accept the communication connection request may include, for example, information indicating whether the first external electronic device 120 will accept or decline a request to establish communication for which there is no associated connection history. The second information may include, in another example, information indicating whether the first external electronic device 120 will accept or decline a communication connection request received from the electronic device 110 when the first external electronic device 120 is powered on (e.g., when the Bluetooth of the first external electronic device 120 is powered on).

According to an embodiment, the electronic device 110 may share (e.g., transmit) first information about at least one first external electronic device (e.g., the first external electronic device 120) with the second external electronic device 130. For example, the electronic device 110 may transmit the first information about the first external electronic device 120 and the second information about the probability whether the first external electronic device 120 will accept the connection request based on the BT address for which there is no connection history, the first information and the second information being associated with each other, to the first external electronic device 120. According to an embodiment, the electronic device 110 may identify a probability that the first external electronic device 120 will accept the connection request based on the second BT address (identify that the first external electronic device 120 accepts or declines the connection request). When it is identified that the first external electronic device 120 will accept the connection request, the electronic device 110 may transmit the first information about the first external electronic device 120 and the second information to the second external electronic device 130. According to another embodiment, when it is identified that the first external electronic device 120 will decline the connection request, the electronic device 110 may refrain from transmitting the first information about the first external electronic device 120 to the second external electronic device 130. In an embodiment, when sharing the first information about the first external electronic device 120 with the second external electronic device 130, the electronic device 110 may directly transmit the first information about the first external electronic device 120 to the second external electronic device 130 or may transmit the first information about the first external electronic device 120 to the second external electronic device 130 via another electronic device (e.g., an external server).

According to an embodiment, when receiving the first information about the first external electronic device 120 and the second information about the possibility that the first external electronic device 120 will accept the connection request based on the BT address for which there is no connection history from the electronic device 110, the second external electronic device 130 may associate and provide the second information with the first information through a user interface. In an embodiment, the second external electronic device 130 may be, for example, a device configured to have the same user account as the electronic device 110. The second external electronic device 130 may be, for another example, a device configured to have an account of a person related to the user of the electronic device 110 (e.g., a family account or a colleague account).

According to an embodiment, when identifying (e.g., receiving) an input associated with establishing BT communication between the second external electronic device 130 and the first external electronic device 120, the second external electronic device 130 may transmit a communication connection request based on the BT address of the second external electronic device 130 to the first external electronic device 120 using the first information about the first external electronic device 120. The first external electronic device 120 may accept the communication connection request of the second external electronic device 130, and the second external electronic device 130 and the first external electronic device 120 may establish BT communication.

According to the above-mentioned embodiment, each of the electronic device 110, the first external electronic device 120, and the second external electronic device 130 may be an electronic device capable of performing BT communication and may be, for example, a portable communication device (e.g., smartphone), a computer device, a portable multimedia device, a portable medical device, a camera, a wearable device, a home appliance, or an accessory device (e.g., BT earphones).

According to the above-mentioned embodiment, the electronic device 110 may configure BT communication information about the first external electronic device 120 capable of establishing BT communication based on an address for which there is no history of establishing BT communication and may share the configured BT communication information to the second external electronic device 130. Alternatively, the electronic device 110 may configure BT communication information that identifies whether it is able to perform BT communication based on an address for which there is no history of establishing BT communication and may share the configured BT communication information to the second external electronic device 130.

Figure 2:
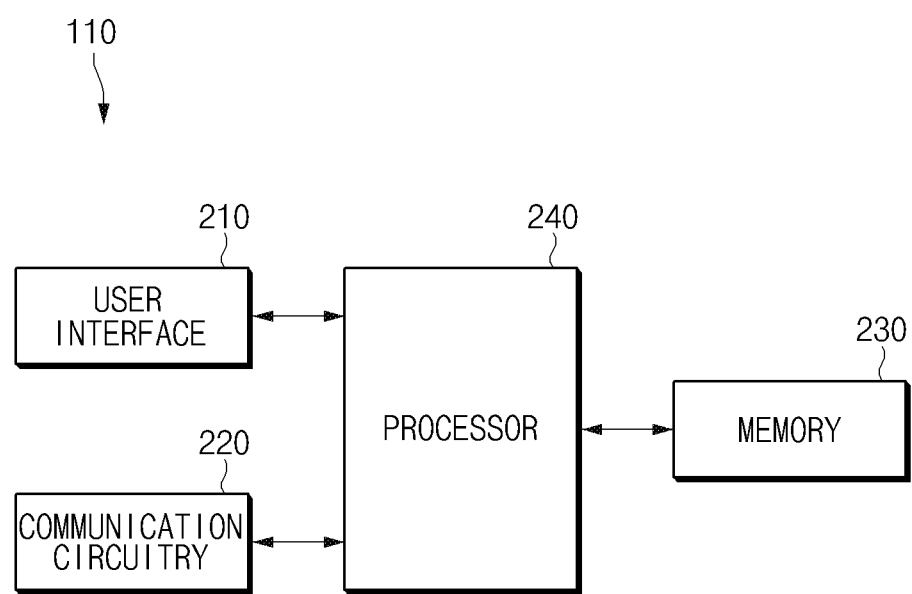
FIG. 2 is a block diagram illustrating a configuration of an electronic device according to an embodiment.

FIG. 2 is a block diagram illustrating a configuration of an electronic device according to an embodiment.

Referring to FIG. 2, an electronic device 110 (e.g., an electronic device 110 of FIG. 1B) according to an embodiment may include a user interface 210 (e.g., the display device 1460 of FIG. 1A), a communication circuitry 220 (e.g., the communication module 1490 of FIG. 1A), a memory 230 (e.g., the memory 1430 of FIG. 1A), and a processor 240 (e.g., the processor 1420 of FIG. 1A). In an embodiment, the electronic device 110 may exclude some components or may further include an additional component. In an embodiment, some of the components of the electronic device 110 may be combined into one entity to perform functions of the components before the combination in the same manner.

According to an embodiment, the user interface 210 may include an input circuitry and a display. The input circuitry may include at least one of a touch sensor or a physical button. The display may include a display included in the electronic device 110 or a display included in another electronic device which communicates with the electronic device 110. In this embodiment, which is an example, the user interface 210 is a touch screen display, i.e. a display combined with a touch sensor.

According to an embodiment, the communication circuitry 220 may include at least one communication circuitry configured to support BT communication. The communication circuitry 220 may be configured with a first BT address. For example, the communication circuitry 220 may include an integrated circuit for BT communication, and the integrated circuit may store the first BT address in its internal memory. The communication circuitry 220 may further include a second BT address different from the first BT address. The first BT address may be, for example, a unique address of the electronic device 110 for BT communication. The second BT address may be, for example, an address different from the unique address of the electronic device 110 for BT communication, and may be used for a plurality of electronic devices including the electronic device 110. The second BT address may be determined, for example, when the electronic device 110 is manufactured, and may be stored in the communication circuitry 220. Alternatively, the second BT address may be randomly set by the processor 240 or may be set by the processor 240 based on at least a part of the first BT address or information received from another electronic device (e.g., a device configured to have the same user account as the electronic device 110). For example, the second BT address may be set based on a BT address of a device configured to have the same user account as the electronic device 110. According to an embodiment, the second BT address may be stored in the memory 230.

According to an embodiment, the memory 230 may store instructions, when executed, causing the processor 240 to establish a communication connection with a first external electronic device (e.g., the first external electronic device 120 of FIG. 1B) based on the first BT address using the communication circuitry 220, end the communication connection with the first external electronic device 120, receive a reconnection request based on the first BT address from the first external electronic device 120 after ending the communication connection, transmit a communication connection request to the first external electronic device 120 based on the second BT address different from the first BT address using the communication circuitry 220 in response to the reconnection request, and store second information about a probability that the first external electronic device 120 will accept or decline the communication connection request in the memory 230. The memory 230 may store, for example, a command or data associated with at least one other component of the electronic device 110. The memory 230 may be a volatile memory (e.g., a random access memory (RAM)), a non-volatile memory (e.g., a read only memory (ROM) or a flash memory), or a combination thereof.

The processor 240 may execute calculation or data processing about control and/or communication of at least one other component of the electronic device 110 using the instructions stored in the memory 230. The processor 240 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 240 may establish a communication connection with the first external electronic device 120 based on the first BT address using the communication circuitry 220 and may end the communication connection with the first external electronic device 120. For example, when receiving an input associated with the communication connection with the first external electronic device 120 through the user interface 210, the processor 240 may establish the communication connection with the first external electronic device 120 based on the first BT address using the communication circuitry 220. The communication connection between the electronic device 110 and the first external electronic device 120 may be intentionally ended by users of the electronic device 110 or the first external electronic device 120, or may be ended due to various factors, such as deterioration in signal intensity of the electronic device 110 or the first external electronic device 120 or an increase in separation distance between the electronic device 110 and the first external electronic device 120. In an embodiment, the processor 240 may store first information about the first external electronic device 120, obtained in a communication connection process (e.g., an inquiry process) based on the first BT address, in the memory 230. The first information about the first external electronic device 120 may include, for example, the BT address of the first external electronic device 120 and/or the name of the first external electronic device 120.

According to an embodiment, when receiving a reconnection request based on the first BT address from the first external electronic device 120 after ending the communication connection with the first external electronic device 120, the processor 240 may transmit a communication connection request to the first external electronic device 120 based on the second BT address using the communication circuitry 220 in response to the reconnection request. Thereafter, the processor 240 may identify that the first external electronic device 120 accepts or declines the communication connection request. For example, when receiving a response to the communication connection request from the first external electronic device 120 within a specified time after transmitting the communication connection request, the processor 240 may determine that the first external electronic device 120 accepted the communication connection request. Otherwise, the processor 240 may determine that the first external electronic device 120 declined the communication connection request. The response may include at least one of, for example, a setup complete event, an authentication success event, an encryption on event, or service discovery protocol (SDP) completion. The specified time may be experimentally set based on the average time for establishing BT communication.

According to an embodiment, the processor 240 may store second information about the probability that the first external electronic device 120 will accept or decline a connection request based on a BT address for which there is no connection history (e.g. the second BT address) in the memory 230. For example, the processor 240 may associated and store the first information about the first external electronic device 120 with the second information about the probability that the first external electronic device 120 will accept the connection request in the memory 230. In another example, the processor 240 may store registered device information, including first information about at least one first external electronic device (e.g., the first external electronic device 120) and second information about a probability that the at least one first external electronic device accepts a connection request, in a memory (e.g., a lookup table of the memory 230). The first information about the at least one first external electronic device may be obtained through communication based on a first BT address with each of the at least one first external electronic device using the communication circuitry 220 by the processor 240. The second information about the probability that the at least one first external electronic device will accept the connection request may be obtained through communication based on a second BT address with each of the at least one first external electronic device using the communication circuitry 220 by the processor 240.

According to an embodiment, after storing the second information about the probability that the first external electronic device 120 will accept the connection request in the memory 230, the processor 240 may establish communication based on the first BT address (hereinafter referred to as "first BT communication") with the first external electronic device 120 using the communication circuitry 220. For example, when the first external electronic device 120 accepts a communication connection request based on the second BT address, the processor 240 may store the second information about the first external electronic device 120 accepting the communication connection request in the memory 230 and may establish communication based on the second BT address (hereinafter referred to as "second BT communication") with the first external electronic device 120 using the communication circuitry 220. Thereafter, the processor 240 may end the second BT communication connection with the first external electronic device 120 and may establish the first BT communication connection with the first external electronic device 120. In another example, when the first external electronic device 120 declines the communication connection request based on the second BT address, the processor 240 may store information about the first external electronic device 120 declining the communication connection request in the memory 230. Thereafter, the processor 240 may establish the first BT communication connection based on the first BT address with the first external electronic device 120. In yet another example, after storing the second information about the probability the first external electronic accepting the communication connection request in the memory 230, the processor 240 may receive a reconnection request based on the first BT address from the first external electronic device 120. In this case, the processor 240 may respond to the reconnection request based on the first BT address and may establish the first BT communication connection with the first external electronic device 120.

According to an embodiment, the processor 240 may share (e.g., transmit) at least a part of the registered device information with a second external electronic device (e.g., a second external electronic device 130 of FIG. 1B) using the communication circuitry 220. For example, the processor 240 may transmit the first information about one or more first external electronic devices included in the registered device information and the second information about the probability whether the first external electronic devices will accept or decline the communication connection request to the second external electronic device 130. In another example, the processor 240 may transmit first information about a first external electronic device selected through the user interface 210 and second information about a probability that the selected first external electronic device will accept a communication connection request to the second external electronic device 130. In yet another example, the processor 240 may selectively transmit the first information about a first external electronic device that will accept the communication connection request based on the second BT address (e.g., a BT address in which there is no connection history) among a plurality of first external electronic devices and the second information about the probability that the selected first external electronic device will accept the communication connection request to the second external electronic device 130. The processor 240 may make this selection based on the second information about the probability that the first external electronic device will accept the communication connection request.

In the exemplary above-mentioned embodiment, when receiving the reconnection request from the first external electronic device 120 after ending the first BT communication with the first external electronic device 120, the processor 240 transmits the communication connection request based on the second BT address. However, the instant disclosure is not so limited. For example, when communication based on the first BT address is established with the first external electronic device 120, the processor 240 may transmit the communication connection request based on the second BT address to the first external electronic device 120. In another example, when the first BT communication is established with the first external electronic device 120, the processor 240 may intentionally end the first BT communication connection and may transmit a communication connection request to the first external electronic device 120 based on the second BT address. In yet another example, after the communication connection based on the first BT address with the first external electronic device 120 is ended, the processor 240 may transmit a communication connection request to the first external electronic device 120 based on the second BT address at a specified time. The specified time may be specified periodically or may be a time when the processor 240 performs an inquiry process.

According to the above-mentioned embodiment, the electronic device 110 may configure BT communication information (registered device information) used to notify a user whether the first external electronic device 120 accepts a communication connection request based on a BT address (e.g., the second BT address) in which there is no connection history. Thus, the second external electronic device 130 which receives the registered device information from the electronic device 110 may be prevented from trying and failing to establish a communication connection with the first external electronic device 120. This reduces the inconvenience of failed BT communication connections.

Figure 3:
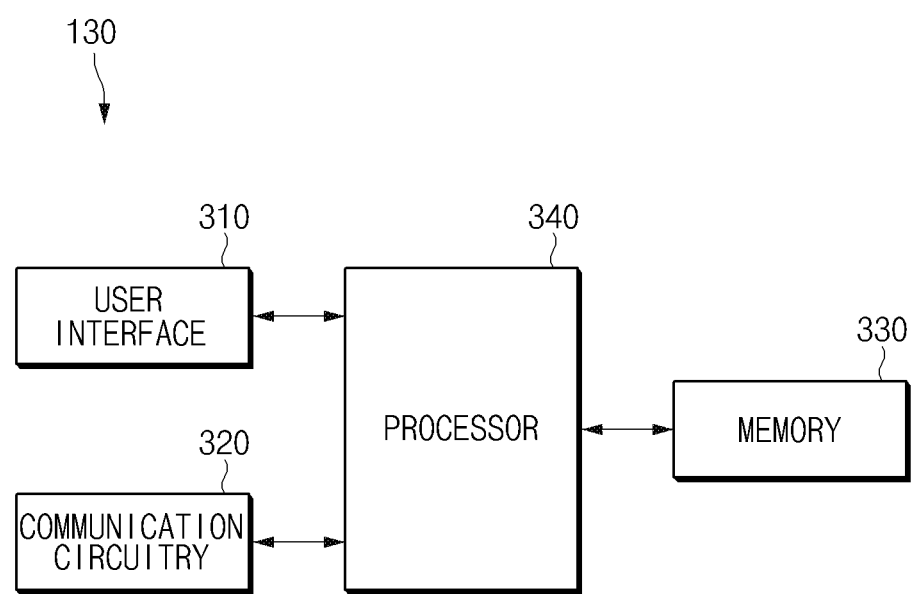
FIG. 3 is a block diagram illustrating a configuration of a second external electronic device according to an embodiment.

FIG. 3 is a block diagram illustrating a configuration of a second external electronic device according to an embodiment.

Referring to FIG. 3, a second external electronic device 130 (e.g., the second external electronic device 130 of FIG. 1B) according to an embodiment may include a user interface 310 (e.g., the display device 1460 of FIG. 1A), a communication circuitry 320 (e.g., the communication module 1490 of FIG. 1A), a memory 330 (e.g., the memory 1430 of FIG. 1A), and a processor 340 (e.g., the processor 1420 of FIG. 1A). In an embodiment, the second external electronic device 130 may exclude some components or may further include an additional component. In an embodiment, some of the components of the second external electronic device 130 may be combined into one entity to perform functions of the components before the combination in the same manner.

According to an embodiment, the user interface 310 may include an input circuitry and a display. The input circuitry may include at least one of a touch sensor or a physical button. The display may include a display included in the second external electronic device 130 or a display included in another electronic device which communicates with the second external electronic device 130. In this embodiment, which is an example, the user interface 310 is a touch screen display, i.e. a display combined with a touch sensor.

According to an embodiment, the communication circuitry 320 may include at least one communication circuitry configured to support BT communication. The communication circuitry 320 may be configured with a third BT address. For example, the communication circuitry 320 may include an integrated circuit for BT communication, and may store the third BT address in an internal memory of the integrated circuit. The third BT address may be, for example, a unique address of the second external electronic device 130 for BT communication.

The memory 330 may include instructions, when executed, causing the processor 340 to receive first information about at least one first external electronic device (e.g., the first external electronic device 120 of FIG. 1B) with which an electronic device (e.g., the electronic device 110 of FIG. 2) is connected through BT communication and second information about a probability that the at least one first external electronic device will accept a connection request using an address for which there is no connection history and provide the second information via the user interface 310. The memory 230 may store, for example, a command or data associated with at least one other component of the second external electronic device 130. The memory 330 may be a volatile memory (e.g., a RAM), a non-volatile memory (e.g., a ROM or a flash memory), or a combination thereof.

The processor 340 may execute calculation or data processing about control and/or communication of at least one other component of the second external electronic device 130 using the instructions stored in the memory 330. The processor 340 may include at least one of, for example, a CPU, a GPU, a microprocessor, an application processor, an ASIC, or FPGA and may have a plurality of cores.

According to an embodiment, the processor 340 may receive first information about at least one first external electronic device with which the electronic device 110 is connected through BT communication and second information about a probability that the at least one first external electronic device will accept a connection request using an address for which there is no connection history, from the electronic device 110 via the communication circuitry 320. For example, when the electronic device 110 transmits registered device information, the processor 340 may receive the registered device information. In another example, when receiving an input associated with receiving registered device information via the user interface 310, the processor 340 may transmit a request associated with transmitting the registered device information to the electronic device 110 and may receive at least a part of the registered device information as a response to the request from the electronic device 110.

According to an embodiment, when the first information about the at least one first external electronic device and the second information about the probability that the at least one first external electronic device will accept the connection request are received, the processor 340 may provide a screen allowing the user select at least a part of the first information and the second information received via the user interface 310. The processor 340 may store the first information and the second information selected through the screen in the memory 330.

According to an embodiment, when the registered device information is received, the processor 340 may provide first guide information for providing a notification that the reception of the registered device information is completed, via the user interface 310. Furthermore, the processor 340 may provide second guide information (e.g., a notification bar) for providing a notification that the registered device information is updated when the registered device information is updated, via the user interface 310. In this case, the processor 340 may provide the updated registered device information via the user interface 310 in response to an input associated with selecting the second guide information.

According to an embodiment, the processor 340 may provide the second information about the probability that the at least one first external electronic device will accept the connection request, via the user interface 310. For example, the processor 340 may classify the at least one first external electronic device into a first type of first external electronic devices which is currently connected through BT communication, a second type of first external electronic devices capable of establishing a BT communication connection based on an address for which there is no connection history, and a third type of first external electronic devices incapable of establishing the BT communication connection based on the address for which there is no connection history. The processor 340 may provide the first information about the at least one first external electronic device via the user interface 310 in the above classification (e.g., one of the first to third types). For example, the processor 340 may display first information about the first type of first external electronic devices in blue, may display first information about the second type of first external electronic devices in black, and may display first information about the third type of first external electronic devices in gray. According to another embodiment, the processor 340 may display the first information about the first type of first external electronic device and the first information about the second type of first external electronic device and may fail to display the first information about the third type of first external electronic device.

According to an embodiment, when receiving an input associated with a connection request for one of the at least one first external electronic device via the user interface 310, the processor 340 may establish a communication connection based on the third BT address using first information about the first external electronic device corresponding to the input associated with the connection request (e.g., the BT address of the first external electronic device).

According to the above-mentioned embodiment, the second external electronic device 130 may provide registered device information including second information about a probability that the at least one first external electronic device 120 will accept a connection request using an address for which there is no connection history. Thus, the user of the second external electronic device 130 may, when attempting to establish a BT communication connection using the registered device information, may readily recognize while first external electronic device the second external electronic device 130 can connect to.

Figure 4A:
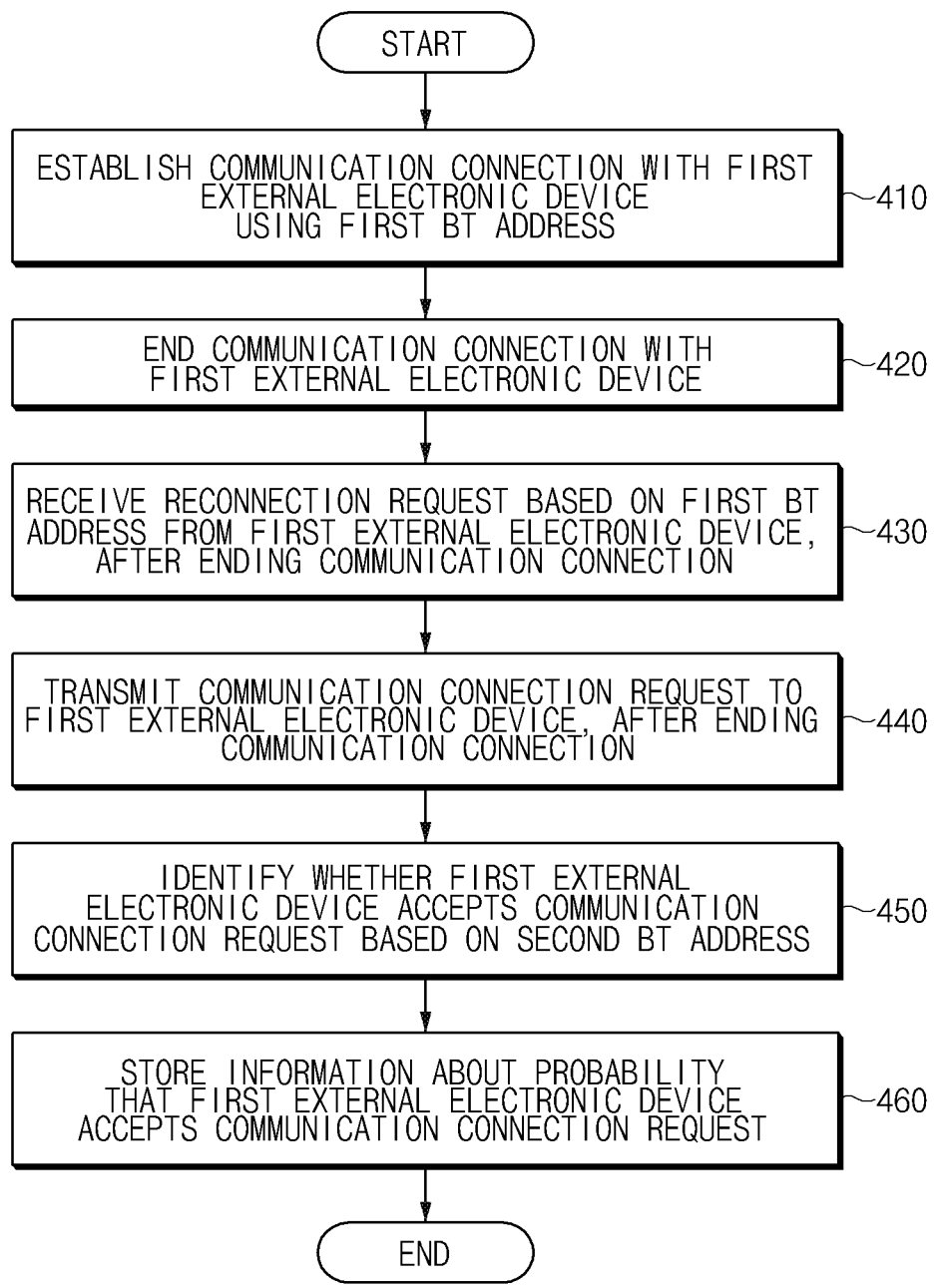
FIG. 4A is a flowchart illustrating a method for generating second information about a probability that a first external electronic device will accept a connection request based on an address for which there is no connection history, according to an embodiment.

FIG. 4A is a flowchart illustrating a method for generating second information about a probability that a first external electronic device will accept a connection request based on an address for which there is no connection history, according to an embodiment.

Referring to FIG. 4A, in operation 410, an electronic device (e.g., the electronic device 110 of FIG. 2) may establish a communication connection with a first external electronic device (e.g., the first external electronic device 120 of FIG. 1B) using a first BT address via a communication circuitry (e.g., the communication circuitry 220 of FIG. 2). The first BT address may be, for example, a unique address of the electronic device 110 for BT communication. In operation 410, the electronic device 110 may store first information about the first external electronic device 120 in a memory (e.g., the memory 230 of FIG. 2). For example, the first information about the first external electronic device 120 may include the BT address and/or the name of the first external electronic device.

In operation 420, the electronic device 110 may end the communication connection with the first external electronic device 120. In operation 420, the communication connection may be ended intentionally by the users of electronic device 110 or the first external electronic device 120 or may be ended due to various factors such as deterioration in signal intensity of the electronic device 110 or the first external electronic device 120 or an increase in separation distance between the electronic device 110 and the first external electronic device 120.

After ending the communication connection with the first external electronic device 120, in operation 430, the electronic device 110 may receive a reconnection request based on the first BT address from the first external electronic device 120.

In operation 440, the electronic device 110 may transmit a communication connection request to the first external electronic device 120 based on a second BT address different from the first BT address using the communication circuitry 220 in response to the reconnection request. For example, the second BT address may be an address for which there is no history of established communication connections with the first external electronic device 120.

In operation 450, the electronic device 110 may identify that the first external electronic device 120 accepts the communication connection request based on the second BT address. When the first external electronic device 120 accepts the communication connection request based on the second BT address, the electronic device 110 may establish BT communication based on the second BT address with the first external electronic device 120.

In operation 460, the electronic device 110 may store second information about a probability that the first external electronic device 120 will accept the communication connection request in the memory 230. For example, the electronic device 110 may associate and store the first information about the first external electronic device 120 with the second information about the probability that the first external electronic device 120 will accept the communication connection request in the memory 230. The second information about the probability that the first external electronic device 120 will accept the communication connection request may include, for example, information indicating whether the first external electronic device 120 accepts or declines a request to establish BT communication for which there is no connection history. The second information about the probability that the first external electronic device 120 will accept the communication connection request may include, in another example, information indicating whether the first external electronic device 120 accepts or declines the communication connection request received from the electronic device 110 when the first external electronic device 120 is powered on (e.g., Bluetooth is powered on).

After operation 460, the electronic device 110 may transmit the reconnection request based on the first BT address to the first external electronic device 120 and may establish a communication connection with the first external electronic device 120 in response to the reconnection request.

According to another embodiment, in operation 430, the electronic device 110 may fail to receive the reconnection request based on the first BT address from the first external electronic device 120 and may transmit a reconnection request based on the second BT address to the first external electronic device 120. In this case, operation 440 may be omitted.

According to yet another embodiments, immediately after ending the communication connection with the first external electronic device 120 in operation 420, the electronic device 110 may transmit the reconnection request based on the second BT address to the first external electronic device 120 as shown in operation 440. In this case, operation 430 may be omitted.

Figure 4B:
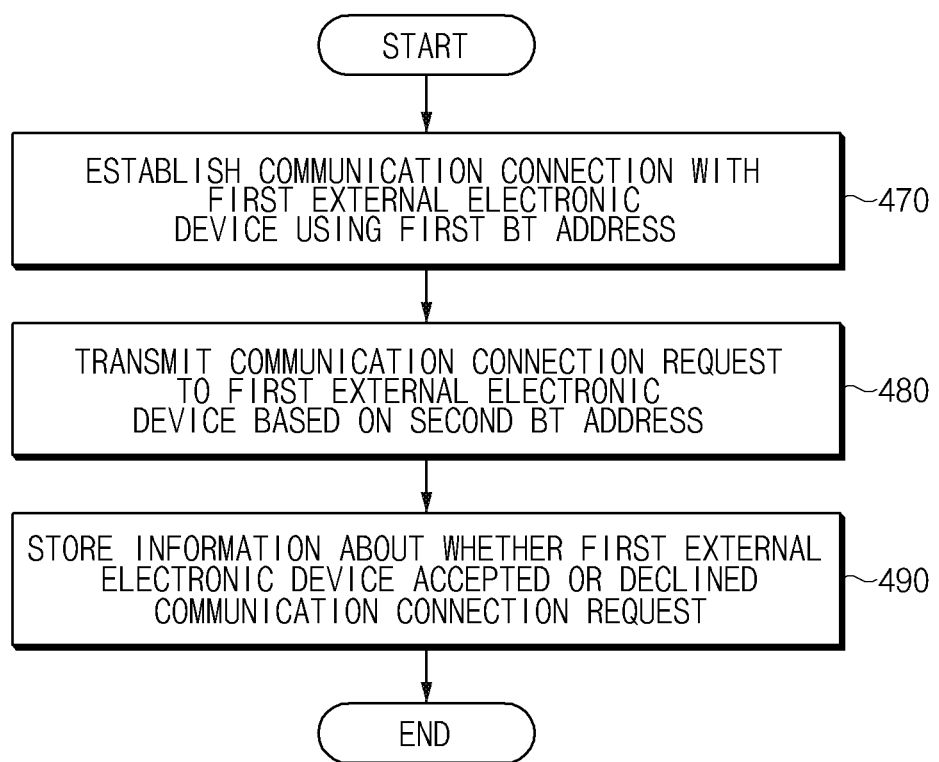
FIG. 4B is a flowchart illustrating a method for storing BT communication information at an electronic device according to an embodiment.

FIG. 4B is a flowchart illustrating a method for storing BT communication information at an electronic device according to an embodiment.

Referring to FIG. 4B, in operation 470, an electronic device (e.g., the electronic device 110 of FIG. 1B) may establish a communication connection with a first external electronic device (e.g., the first external electronic device 120 of FIG. 1B) using a first BT address. The first BT address may be, for example, a unique address of the electronic device 110 for BT communication. In operation 470, the electronic device 110 may store first information about the first external electronic device 120 in a memory (e.g., a memory 230 of FIG. 2). For example, the first information about the first external electronic device 120 may include the BT address and/or the name of the first external electronic device 120.

In operation 480, the electronic device 110 may transmit a communication connection request to the first external electronic device 120 based on a second BT address. The second BT address may be an address for which there is no history of established communication connections with the first external electronic device 120.

In operation 490, the electronic device 110 may store second information about whether the first external electronic device 120 accepted or declined the communication connection request based on the second BT address. For example, the electronic device 110 may identify that the first external electronic device 120 accepted or declined the communication connection request based on the second BT address and may store information about the identified acceptance or denial.

Figure 5A:
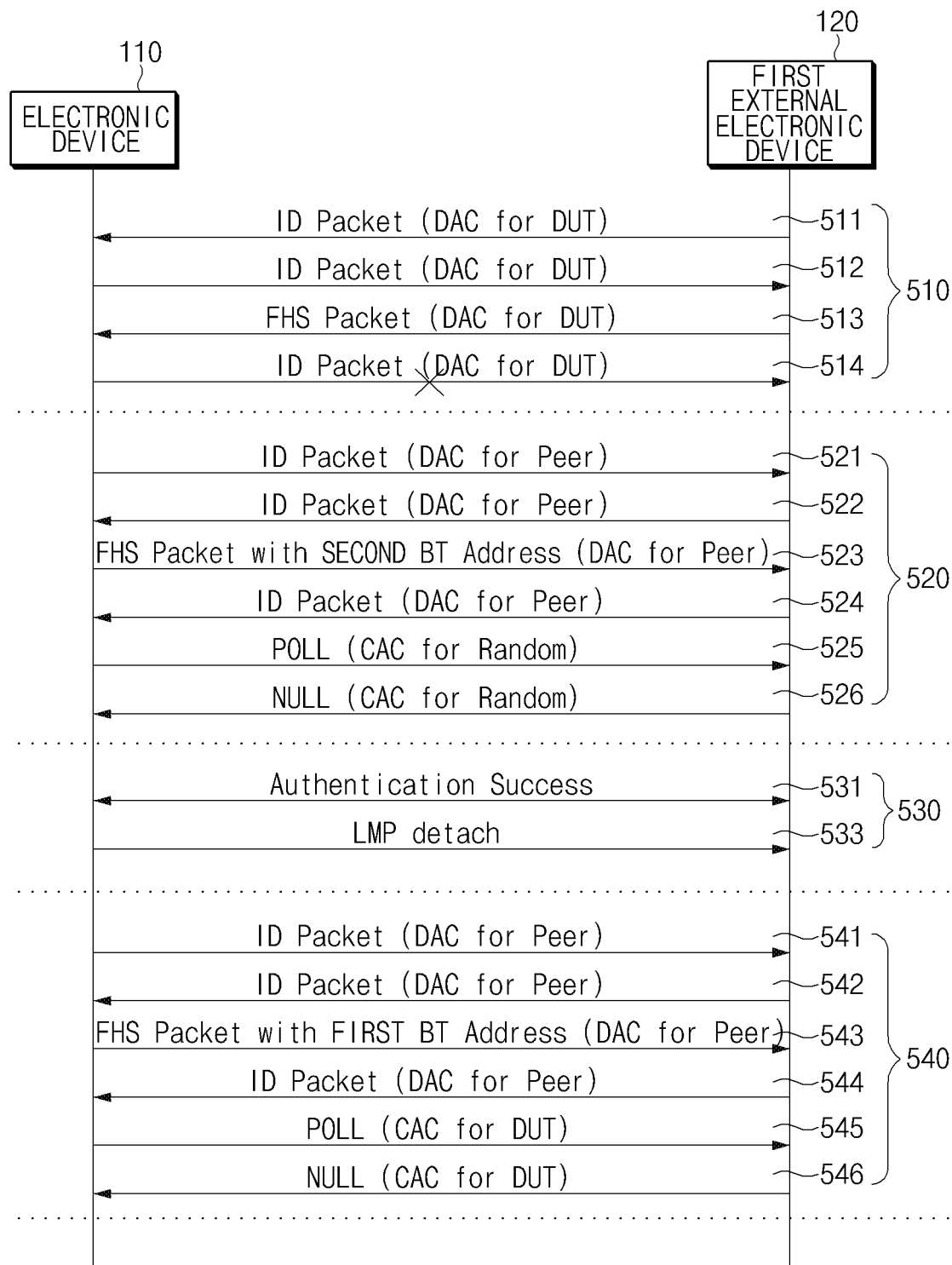
FIG. 5A is a signal sequence diagram illustrating a method for generating second information about whether a first external electronic device accepts a communication connection request based on a BT address for which there is no connection history, according to an embodiment.

FIG. 5A is a signal sequence diagram illustrating a method for generating second information about whether a first external electronic device accepts a communication connection request based on a BT address for which there is no connection history, according to an embodiment. The electronic device 110 may include a host (e.g., an application processor) and a client (e.g., a call processor). Operations of FIG. 5A may be performed by the client. Herein, prior to operation 510, the client may establish a communication connection with the host and may receive a command to identify information about whether the first external electronic device 120 would accept or decline a communication connection request based on a BT address for which there is no connection history from the host. The client may perform the operations of FIG. 5A based on the received command. In this case, the client may transmit information associated with the completion of operation 540 to the host, and may stop performing the operation of FIG. 5A by receiving a command to stop identifying the information from the host. In another embodiment, when the client is initialized, it may perform the operations of FIG. 5A, even if it does not receive the command from the host.

Referring to FIG. 5A, in operation 510, the electronic device 110 may receive a reconnection request from the first external electronic device 120. Together the two devices have a history of establishing a first BT communication connection. For example, when receiving an ID packet with a first access code from the first external electronic device 120 in operation 511, the electronic device 110 may transmit the ID packet with the first access code as the response in operation 512. The first access code (a device access code (DAC) for device under test (DUT)) may be generated based on a unique address (Lower Address Part "LAP" of the first BT address) of the electronic device 110 for BT communication. When the ID packet with the first access code is received, the first external electronic device 120 may transmit the BT address of the first external electronic device 120 and an FHS packet with the first access code in operation 513. Although receiving the FHS packet with the first access code, the electronic device 110 may fail to transmit the ID packet with the first access code, which responds to the FHS packet, in operation 514. In operation 520, the electronic device 110 may transmit a communication connection request based on a second BT address (an address different from the first BT address) to the first external electronic device 120 in response to the reconnection request of the first external electronic device 120. For example, the electronic device 110 may transmit an ID packet with a second access code (DAC for Peer) in response to the reconnection request in operation 521 and may receive an ID packet with the second access code as the response from the first external electronic device 120 in operation 522. The electronic device 110 may transmit an FHS packet with the second BTS address in operation 523 and may receive an ID packet with the second access code as the response from the first external electronic device 120 in operation 524. Thereafter, the electronic device 110 and the first external electronic device 120 may exchange a first poll and a first null based on the second BT address in operations 525 and 526.

In operation 530, the electronic device 110 may identify that the first external electronic device 120 accepts (or declines) the communication connection request based on the second BT address. For example, when identifying that authentication with the first external electronic device 120 succeeds within a specified time in operation 531 after transmitting the communication connection request based on the second BT address, the electronic device 110 may determine that the first external electronic device 120 accepts the communication connection request. After identifying that the first external electronic device 120 accepts or declines the communication connection request based on the second BT address, the electronic device 110 may store second information about whether the first external electronic device 120 accepts or declines the communication connection request in a memory (e.g., a memory 230 of FIG. 2). After identifying that the first external electronic device 120 accepts or declines the communication connection request based on the second BT address, the electronic device 110 may release the communication connection based on the second BT address in operation 533.

In operation 540, the electronic device 110 may establish a communication connection based on the first BT address. The electronic device 110 may transmit a reconnection request based on a BT address of the first external electronic device 120 to the first external electronic device 120 to be re-connected with the first external electronic device 120 and may establish a communication connection with first external electronic device 120 as the response. For example, the electronic device 110 may transmit an ID packet with the second access code (DAC for Peer) in operation 541 and may receive an ID packet with the second access code as the response from the first external electronic device 120 in operation 542. Thereafter, the electronic device 110 may transmit an FHS packet with a first BT address in operation 543 and may receive an ID packet with the second access code as the response from the first external electronic device 120 in operation 544. Thereafter, the electronic device 110 may exchange a first poll and a first null with the first external electronic device 120 based on the first BT address in operations 545 and 546 and may establish the communication connection with the first external electronic device 120.

Figure 5B:
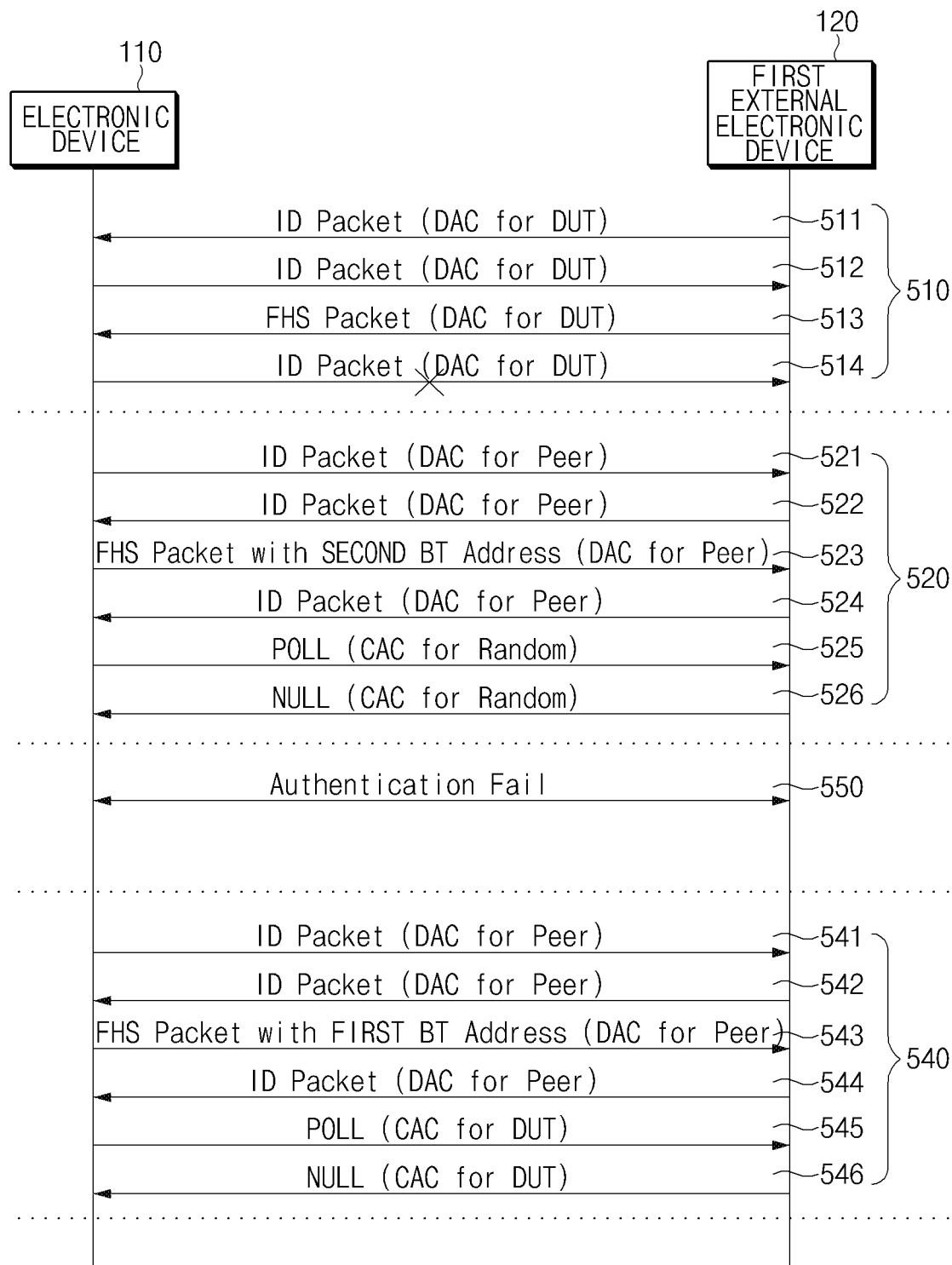
FIGS. 5B, 5C, and 5D are signal sequence diagrams illustrating methods for generating second information about whether a first external electronic device declines a communication connection request based on a BT address for which there is no connection history, according to an embodiment.
Figure 5C:
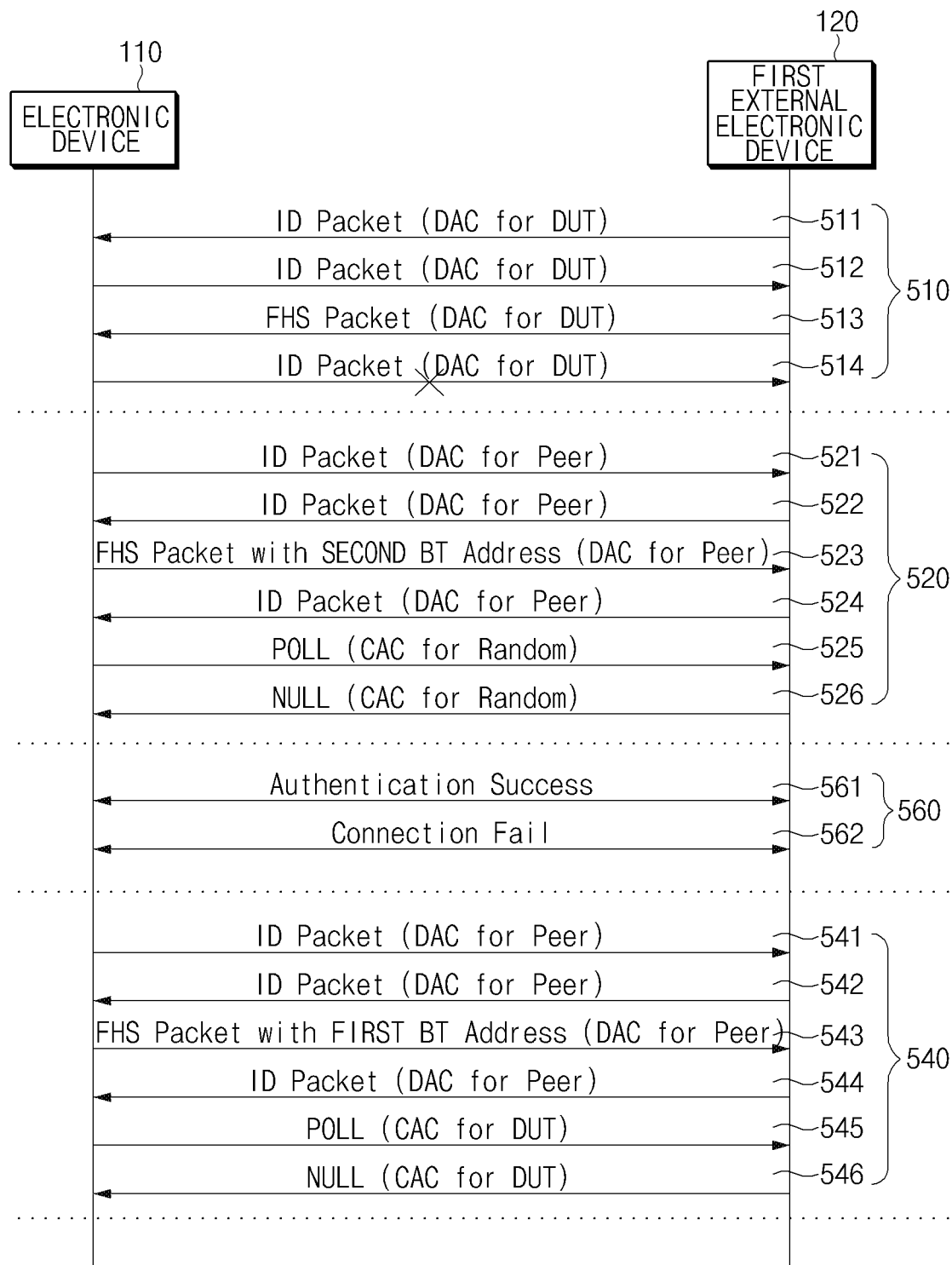
Figure 5D:
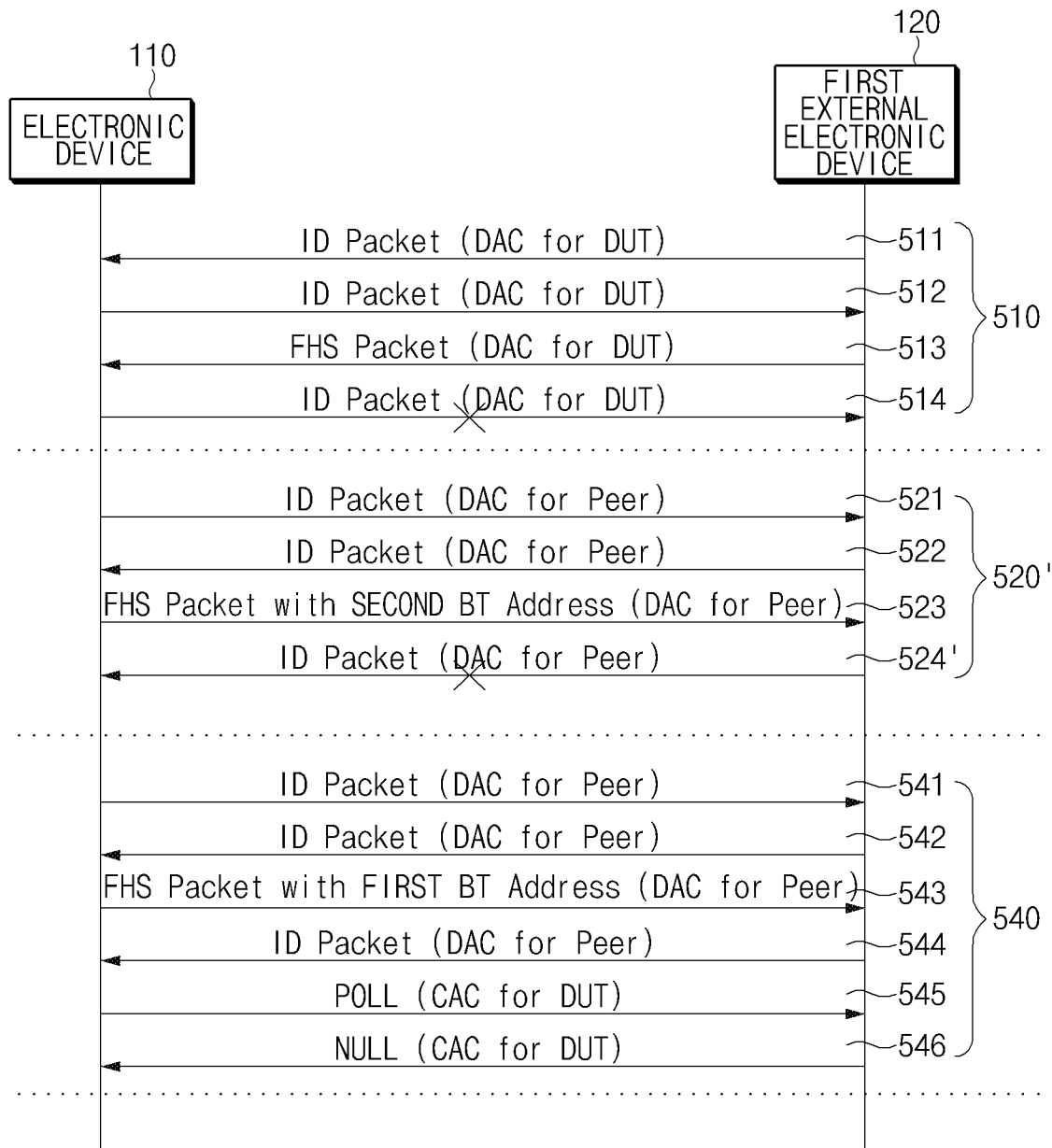

FIGS. 5B to 5D are signal sequence diagrams illustrating methods for generating second information about whether a first external electronic device declines a communication connection request based on a BT address for which there is no connection history, according to an embodiment.

FIG. 5B includes operation 550 rather than operation 530 of FIG. 5A. FIG. 5C includes operation 560 rather than operation 530 of FIG. 5A. FIG. 5D includes operation 520' rather than operation 520 of FIG. 5A. FIGS. 5B to 5D is different from FIG. 5A in that operation 530 is omitted. Thus, description will be given below of the difference.

Referring to FIG. 5B, in operation 550, an electronic device 110 may identify that the first external electronic device 120 fails in authenticating a communication connection request based on the second BT address. In this case, the electronic device 110 may determine that the first external electronic device 120 has declined the communication connection request based on the BT address for which there is no connection history and may associate and store second information about the first external electronic device 120 declining the communication connection request with first information about the first external electronic device 120 in a memory (e.g., a memory 230 of FIG. 2).

Referring to FIG. 5C, in operation 561, the electronic device 110 may identify that the first external electronic device 120 succeeds in authenticating the communication connection request based on the second BT address. However, in operation 562, the electronic device 110 may identify that the first external electronic device 120 has not connected. In this case, the electronic device 110 may determine that the first external electronic device 120 has declined the communication connection request based on a BT address for which there is no connection history and may associate and store second information about the first external electronic device 120 declining the communication connection request with first information about the first external electronic device 120 in the memory 230.

Referring to FIG. 5D, in operation 520', the electronic device 110 may transmit an ID packet with a second access code (DAC for Peer) in response to a reconnection request of the first external electronic device 120 in operation 521 and may receive an ID packet with the second access code as the response from the first external electronic device 120 in operation 522. The electronic device 110 may transmit an FHS packet with a second BT address in operation 523 and may fail to receive an ID packet with the second access code from the first external electronic device 120 in operation 524'. In this case, the electronic device 110 may determine that the first external electronic device 120 has declined a communication connection request based on a BT address for which there is no connection history and may associate and store second information about the first external electronic device 120 declining the communication connection request with first information about the first external electronic device 120 in the memory 230.

Figure 5E:
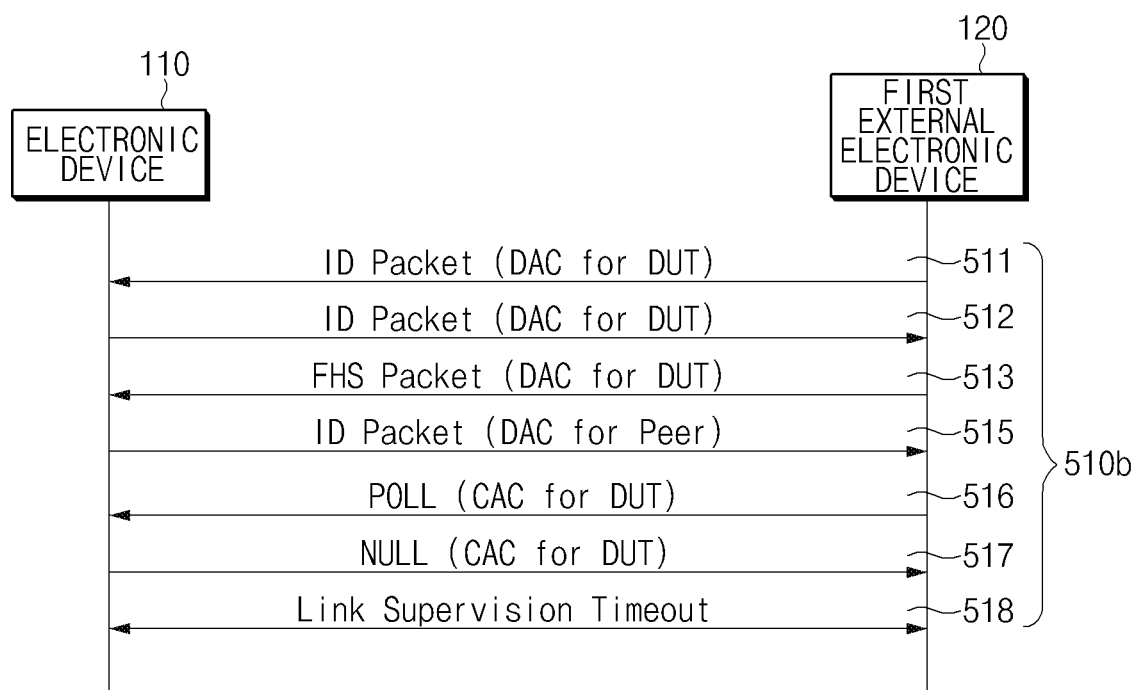
FIGS. 5E, 5F, and 5G are signal sequence diagrams illustrating methods where an electronic device does not receive a reconnection request from a first external electronic device, according to an embodiment.
Figure 5F:
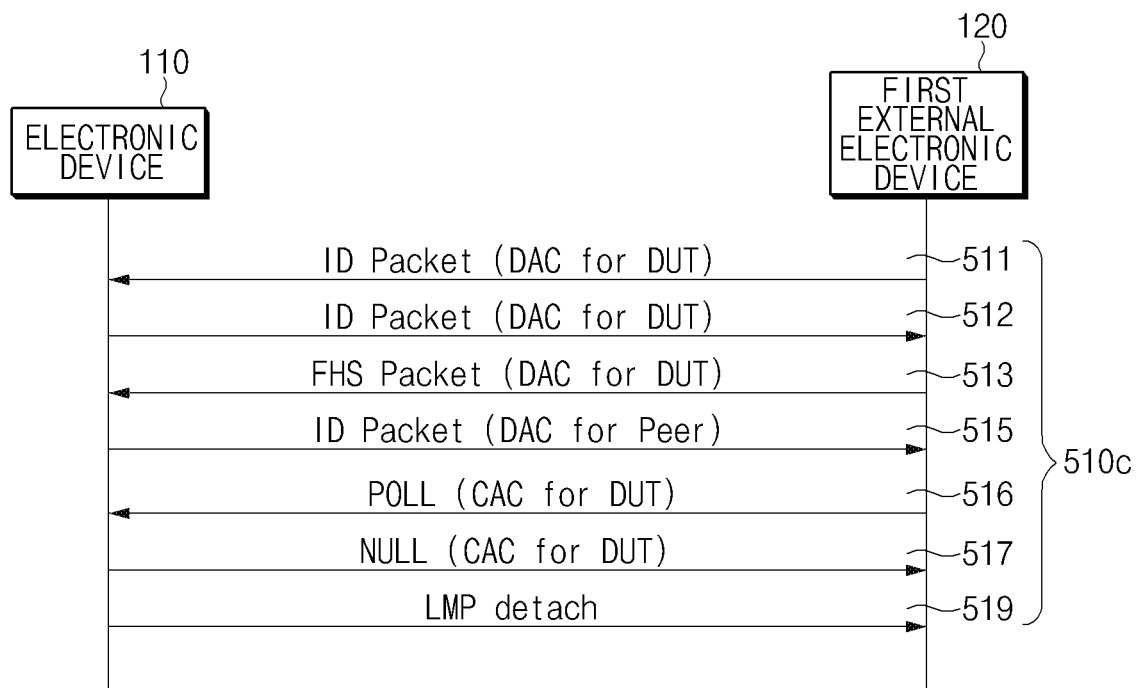
Figure 5G:
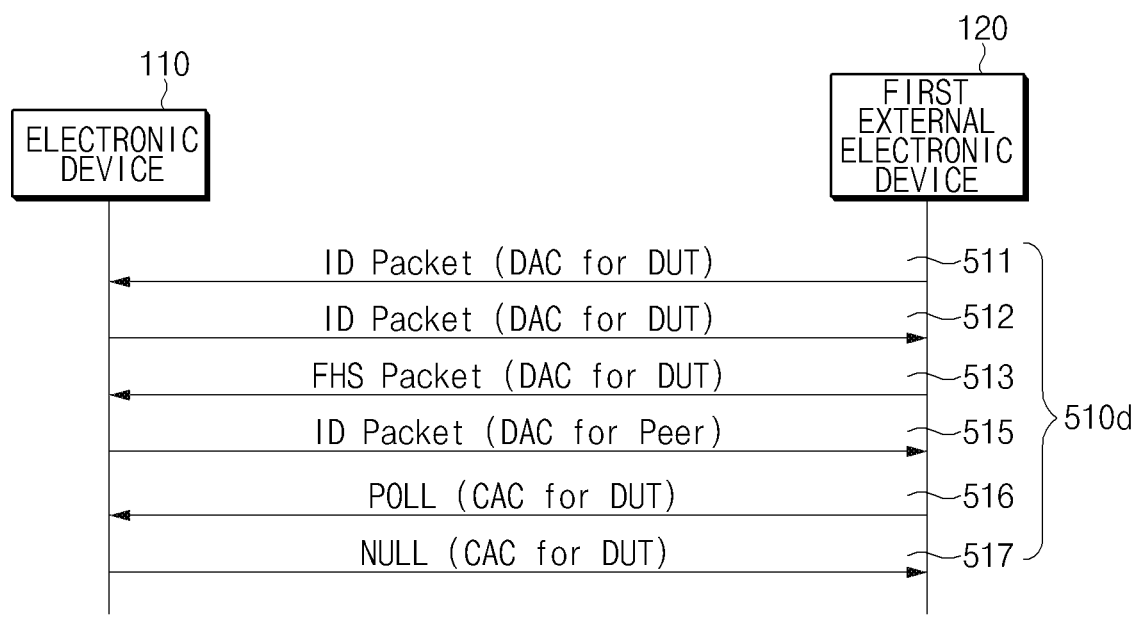

FIGS. 5E to 5G are signal sequence diagrams illustrating methods where an electronic device does not receive a reconnection request from a first external electronic device, according to an embodiment.

FIGS. 5E to 5G are different from FIG. 5A in that FIG. 5E includes operation 510b rather than operation 510 of FIG. 5A, FIG. 5F includes operation 510c rather than operation 510 of FIG. 5A, and FIG. 5G includes operation 510d rather than operation 510 of FIG. 5A. Thus, descriptions will be given below of the difference.

Referring to FIG. 5E, in operation 511, an electronic device 110 may receive an ID packet with a first access code from a first external electronic device 120 which has a history of establishing a first BT communication connection. In operation 512, the electronic device 110 may transmit an ID packet with the first access code as the response. When the ID packet with the first access code is received, in operation 513, the first external electronic device 120 may transmit a BT address of the first external electronic device 120 and an FHS packet with the first access code. In operation 515, the electronic device 110 may transmit an ID packet with a second access code (DAC for Peer). In operations 516 and 517, the electronic device 110 may exchange a first poll and a first null with the first external electronic device 120 based on a first BT address. In operation 518, the electronic device 110 may refrain from performing a subsequent operation such as authentication and may wait until the communication connection expires.

Referring to FIG. 5F, in operation 511, the electronic device 110 may receive an ID packet with a first access code from the first external electronic device 120 which has a history of establishing a first BT communication connection. In operation 512, the electronic device 110 may transmit an ID packet with the first access code as the response. When the ID packet with the first access code is received, in operation 513, the first external electronic device 120 may transmit a BT address of the first external electronic device 120 and an FHS packet with the first access code. In operation 515, the electronic device 110 may transmit an ID packet with a second access code (DAC for Peer). In operations 516 and 517, the electronic device 110 may exchange a first poll and a first null with the first external electronic device 120 based on a first BT address. In operation 519, the electronic device 110 may release the communication connection with the first external electronic device 120.

Referring to FIG. 5G, in operation 511, the electronic device 110 may receive an ID packet with a first access code from the first external electronic device 120 which has a history of establishing a first BT communication connection. In operation 512, the electronic device 110 may transmit an ID packet with the first access code as the response. When the ID packet with the first access code is received, in operation 513, the first external electronic device 120 may transmit a BT address of the first external electronic device 120 and an FHS packet with the first access code. In operation 515, the electronic device 110 may transmit an ID packet with a second access code (DAC for Peer). In operations 516 and 517, the electronic device 110 may exchange a first poll and a first null with the first external electronic device 120 based on a first BT address. Thereafter, the electronic device 110 may perform operations 520 to 540 of FIG. 5A.

Figure 6:
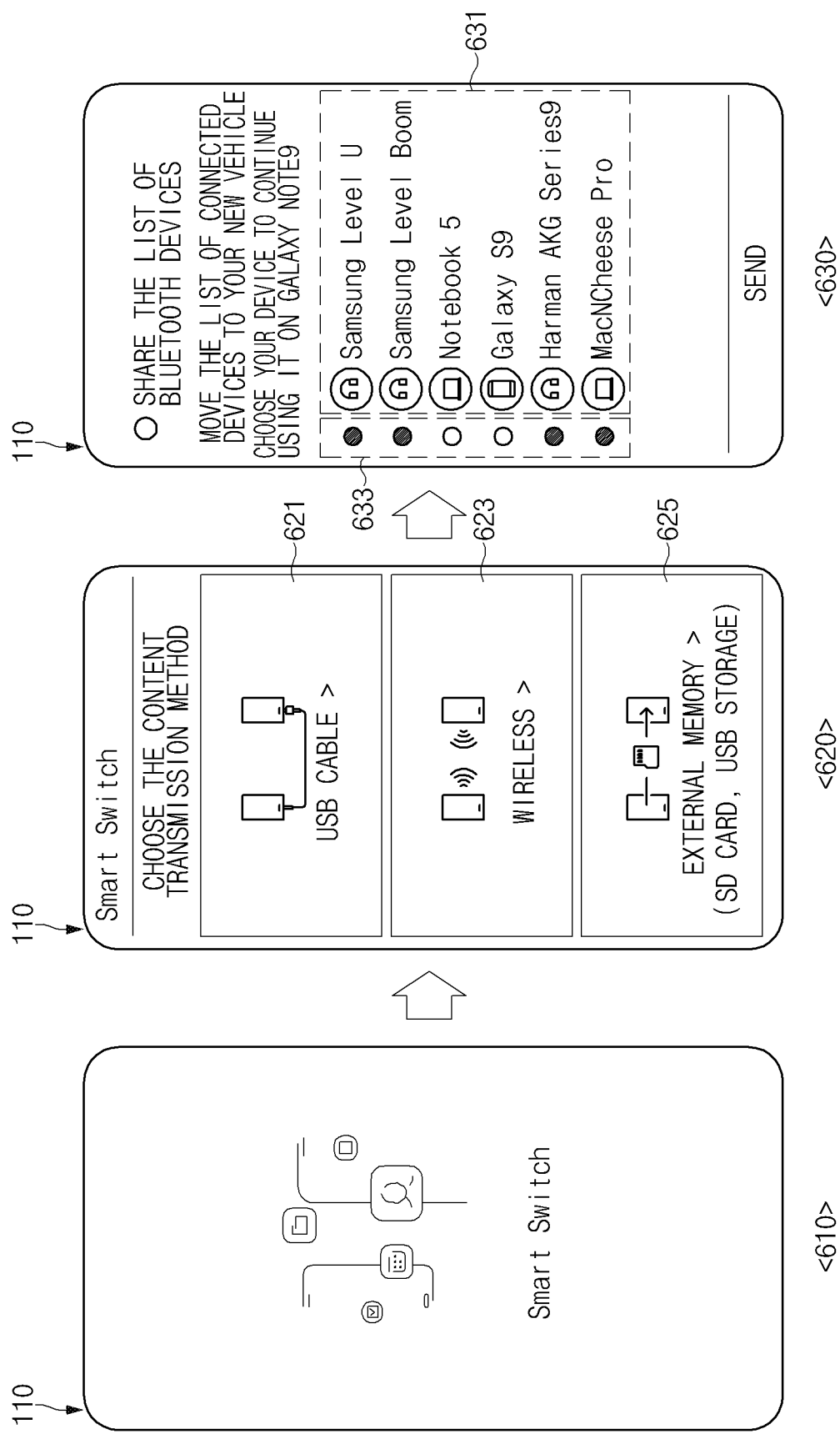
FIG. 6 is a drawing illustrating an example of a UI screen for sharing registered device information according to an embodiment.

FIG. 6 is a drawing illustrating an example of a UI screen for sharing registered device information according to an embodiment. FIG. 6 illustrates an example of sharing registered device information using a specified app of an electronic device 110.

Referring to FIG. 6, in reference numeral 610, when receiving an input associated with executing the specified app, the electronic device 110 may execute the specified app, called "Smart Switch" in this embodiment. The specified app may be an app that provides a function for sharing registered device information.

In reference numeral 620, when the specified app is run, the electronic device 110 may provide virtual buttons for selecting registered device information transmission methods. The virtual buttons may include, for example, a virtual button 621 for selecting a first method using USB communication, a virtual button 623 for selecting a second method using wireless communication (e.g., Wi-Fi or BT), and a virtual button 625 for selecting a third method using an external memory (e.g., an SD card or a USB storage).

In reference numeral 630, when one of the first to third methods is selected by a user input, the electronic device 110 may provide first information 631 about at least one first external electronic device and virtual buttons 633 for selecting first information about at least some of the at least one first external electronic device. The first information may be transmitted to a second external electronic device 130. The electronic device 110 may transmit only first information about the first external electronic device selected using the virtual buttons 633 to the second external electronic device 130. For example, when the virtual button 621 for selecting the first method is selected, the electronic device 110 may transmit the first information about the selected first external electronic device(s) to the second external electronic device 130 which is connected with the electronic device 110 through USB communication. In another example, when the virtual button 623 for selecting the second method is selected, the electronic device 110 may transmit the first information about the selected first external electronic device(s) to the second external electronic device 130 which is connected with the electronic device 110 through wireless communication. In yet another example, when the virtual button 625 for selecting the third method is selected, the electronic device 110 may store the first information about the selected first external electronic device(s) in an external memory of the electronic device 110. The external memory may then be transferred to the second external electronic device 130 such that the first information is transmitted via the external memory.

Figure 7:
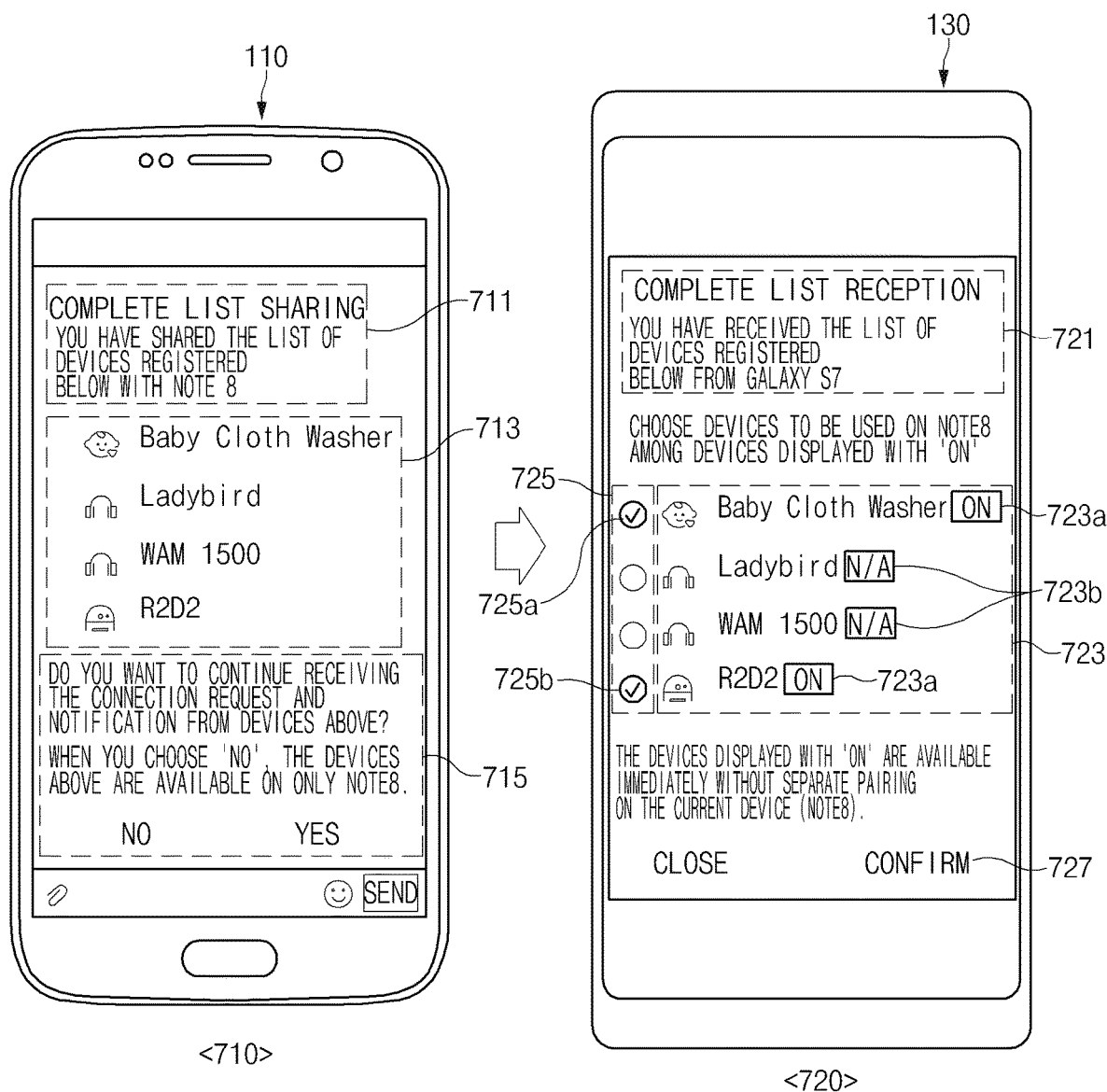
FIG. 7 is a drawing illustrating another example of a UI screen for sharing registered device information according to an embodiment.

FIG. 7 is a drawing illustrating another example of a UI screen for sharing registered device information according to an embodiment.

Referring to FIG. 7, after transmitting registered device information to a second external electronic device 130, an electronic device 110 may provide a notification that the transmission of the registered device information is completed. For example, reference numeral 710 may include information 711 for providing a notification that the transmission of the registered device information is completed and transmitted (shared) first information 713 about at least one first external electronic device. Reference numeral 710 may further include information 715 for selecting to delete or maintain transmitted first information 713 about the at least one first external electronic device after the electronic device 110 transmits the first information 713 to the second external electronic device 130. When it is selected to delete the transmitted first information 713, the electronic device 110 may not receive further connection requests and notifications from the at least one first external electronic device. According to another embodiment, when the first information 713 about the first external electronic device is matched with a specified condition such as a certain time or a specific place, the electronic device 110 may be configured to receive a connection request and notification from the at least one first external electronic device.

After receiving the first information about the at least one first external electronic device from the electronic device 110, the second external electronic device 130 may provide a notification that the reception of the first information 723 about the at least one first external electronic device is completed. For example, reference numeral 720 may include information 721 for providing a notification that the reception of the first information 723 about the at least one first external electronic device is completed, the received first information 723 about the at least one first external electronic device, and a virtual button 725 for selecting first information about the first external electronic device to be stored in a memory of the second external electronic device 130. The first information about the first external electronic device may include information 723a indicating the second type of first external electronic device capable of establishing a BT communication connection based on an address for which there is no connection history and information 723b indicating the third type of first external electronic device incapable of establishing a BT communication connection based on an address for which there is no connection history.

When identifying a request (e.g., selecting the virtual button 727) associated with storing first information about the selected first external electronic device, the second external electronic device 130 may store only first information 725a and 725b about the selected first external electronic devices in a memory (e.g., a memory 330 of FIG. 3). In this case, the second external electronic device 130 may transmit a request to release the previous connection to the first external electronic device 120 or stop a scan operation to the electronic device 110. The electronic device 110 may release the previous connection to the first external electronic device 120 and may stop the scan operation, in response to the request.

According to another embodiments, after sharing the first information about the at least one first external electronic device with the second external electronic device 130, the electronic device 110 may still store the first information about the at least one first external electronic device. In this case, when the second external electronic device 130 attempts to establish a BT communication connection based on the first information about the at least one first external electronic device, the electronic device 110 may scan the at least one first external electronic device and may interfere with BT communication between the second external electronic device 130 and the first external electronic device. To prevent it, when matched with a specified condition, the electronic device 110 may refrain from establishing a BT communication connection based on the first information about the at least one first external electronic device. As examples, when the electronic device 110 is close to the second external electronic device 130 within a specified distance, when a first specified time interval does not elapse after the electronic device 110 shares the first information about the at least one first external electronic device, or when a second specified time interval does not elapse after the electronic device 110 receives a request to stop a communication connection based on the first information about the at least one first external electronic device, the electronic device 110 may refrain from establishing the BT communication connection based on the first information about the at least one first external electronic device. The electronic device 110 may receive information about a mediation device (e.g., an access point or a base station) the second external electronic device 130 accesses or location information (GPS information) of the second external electronic device 130 and may determine whether there is the mediation device on the same space as the second external electronic device 130. According to another embodiment, the electronic device 110 may receive the mediation device information and the location information from an external server (e.g., an external server 400 of FIG. 9).

Figure 8:
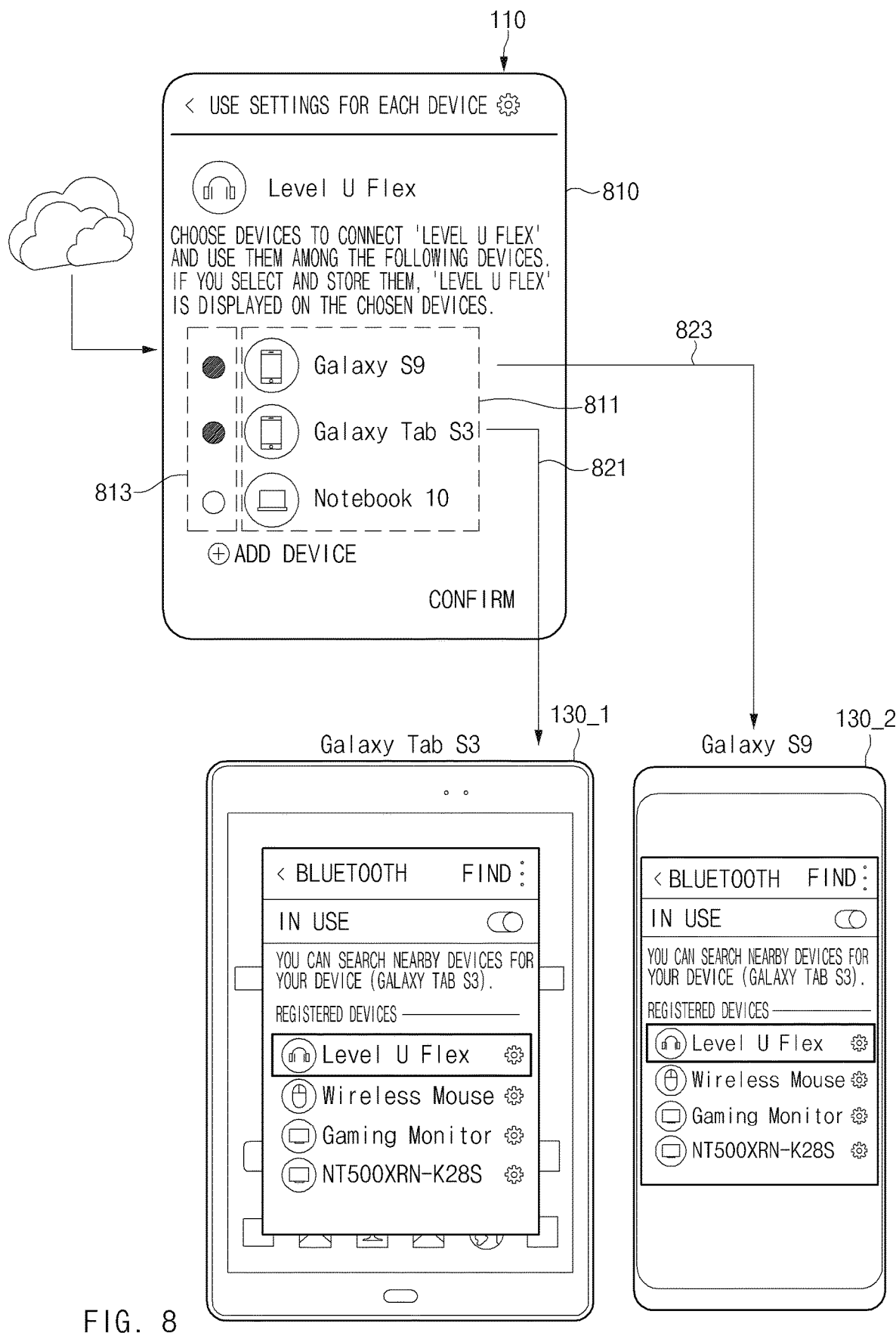
FIG. 8 is a drawing illustrating an example of sharing registered device information at an electronic device according to an embodiment.

FIG. 8 is a drawing illustrating an example of sharing registered device information at an electronic device according to an embodiment.

Referring to FIG. 8, an electronic device 110 may transmit registered device information about a first external electronic device 120 to second external electronic devices 130_1 and 130_2 such that the second external electronic devices 130_1 and 130_2 can easily establish a BT communication connection with the first external electronic device 120.

For example, when a BT detailed setting for the first external electronic device 120 called "Level U Flex" included in the registered device information is selected, the electronic device 110 may display a screen 810 including a specified electronic device list 811, which includes electronic devices capable of sharing first information about the first external electronic device 120, and virtual buttons 813 for selecting at least some of the electronic devices included in the specified electronic device list 811. The specified electronic device list 811 may include, for example, at least one specified electronic device, capable of performing BT communication, configured to have the same user account as the electronic device 110 or an account of a person associated with the electronic device 110. The specified electronic device list 811 may be received from, for example, an external server (e.g., a server which manages a user account set in the electronic device 110).

As shown by reference numerals 821 and 823, the electronic device 110 may transmit the first information about the first external electronic device 120 to the first specified electronic device (e.g., Galaxy Tab S3) 130_1 and the second specified electronic device (e.g., Galaxy S9) 130_2, which are selected through the virtual buttons 813.

Figure 9:
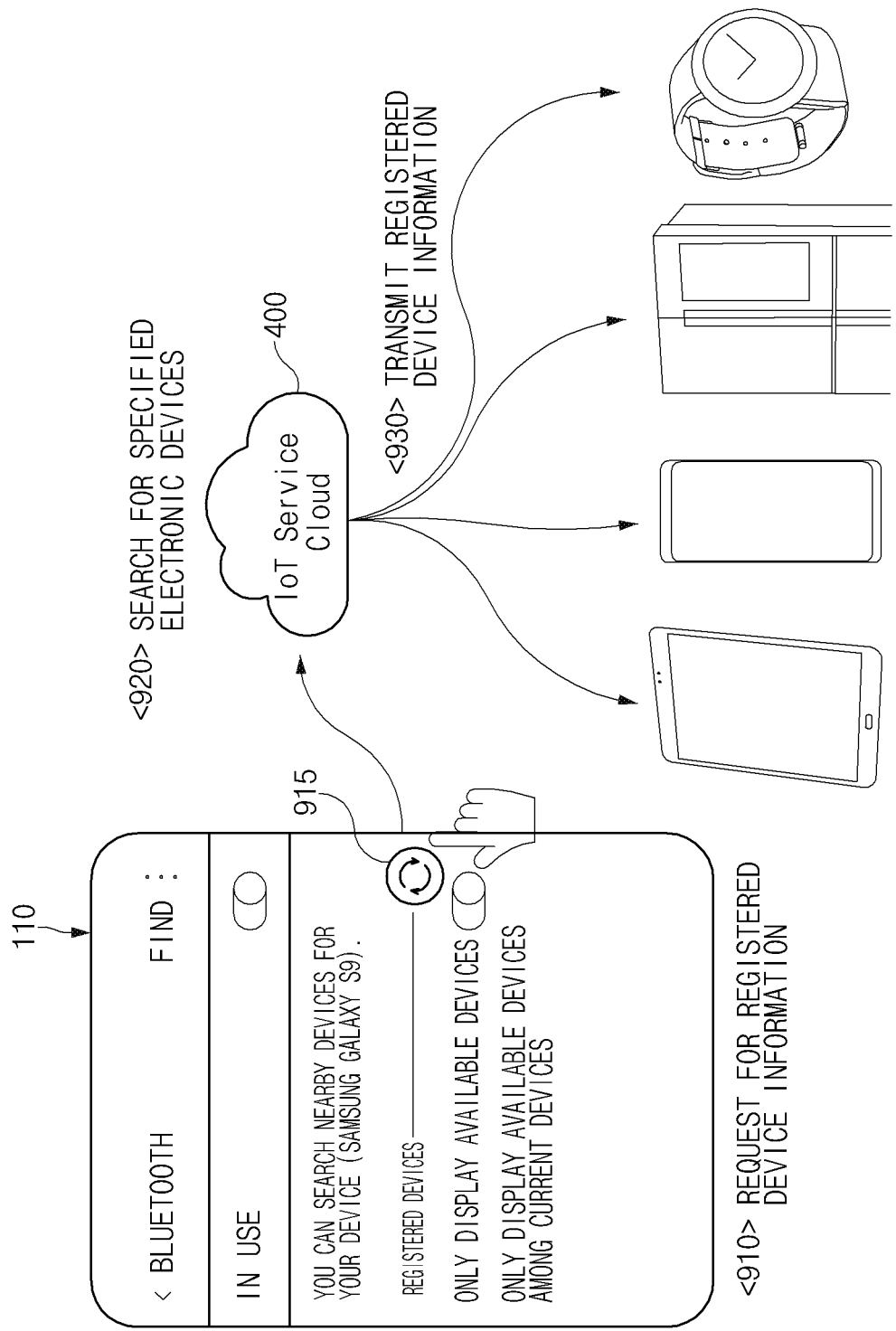
FIG. 9 is a drawing illustrating another example of sharing registered device information at an electronic device according to an embodiment.

According to another embodiment, the electronic device 110 may share the first information about the first external electronic device 120 with the first specified electronic device 130_1 and the second specified electronic device 130_2 via an external server (e.g., an external server 400 of FIG. 9).

FIG. 9 is a drawing illustrating another example of sharing registered device information at an electronic device according to an embodiment.

Referring to FIG. 9, in response to a request for registered device information, an electronic device 110 may transmit the registered device information to a specified electronic device via an external server 400.

In operation 910, when identifying an input 915 associated with the request for the registered device information, the electronic device 110 may request the external server 400 to share the registered device information with the specified electronic device. Upon the request, the electronic device 110 may transmit the registered device information to the external server 400. The external server 400 may be, for example, a server which manages a user account set in the electronic device 110.

In operation 920, when receiving the registered device information from the electronic device 110, the external server 400 may search for a specified electronic device corresponding to the registered device information. The specified electronic device may include, for example, a device which supports BT communication among electronic devices configured to have the same user account as the electronic device 110.

In operation 930, the external server 400 may transmit the registered device information to the specified electronic device corresponding to the registered device information. According to another embodiment, when the received registered device information is not updated (e.g., is identical to previously received registered device information), the electronic device 110 or the external server 400 may refrain from transmitting the registered device information to the external server 400 or the specified electronic device.

According to another embodiment, when there is previously stored registered device information, the electronic device 110 may receive updated registered device information from the external server 400 in response to the input 915 and may store the updated registered device information.

According to another embodiment, the electronic device 110 may transmit the registered device information to the specified electronic device without intervention of the external server 400.

Figure 10:
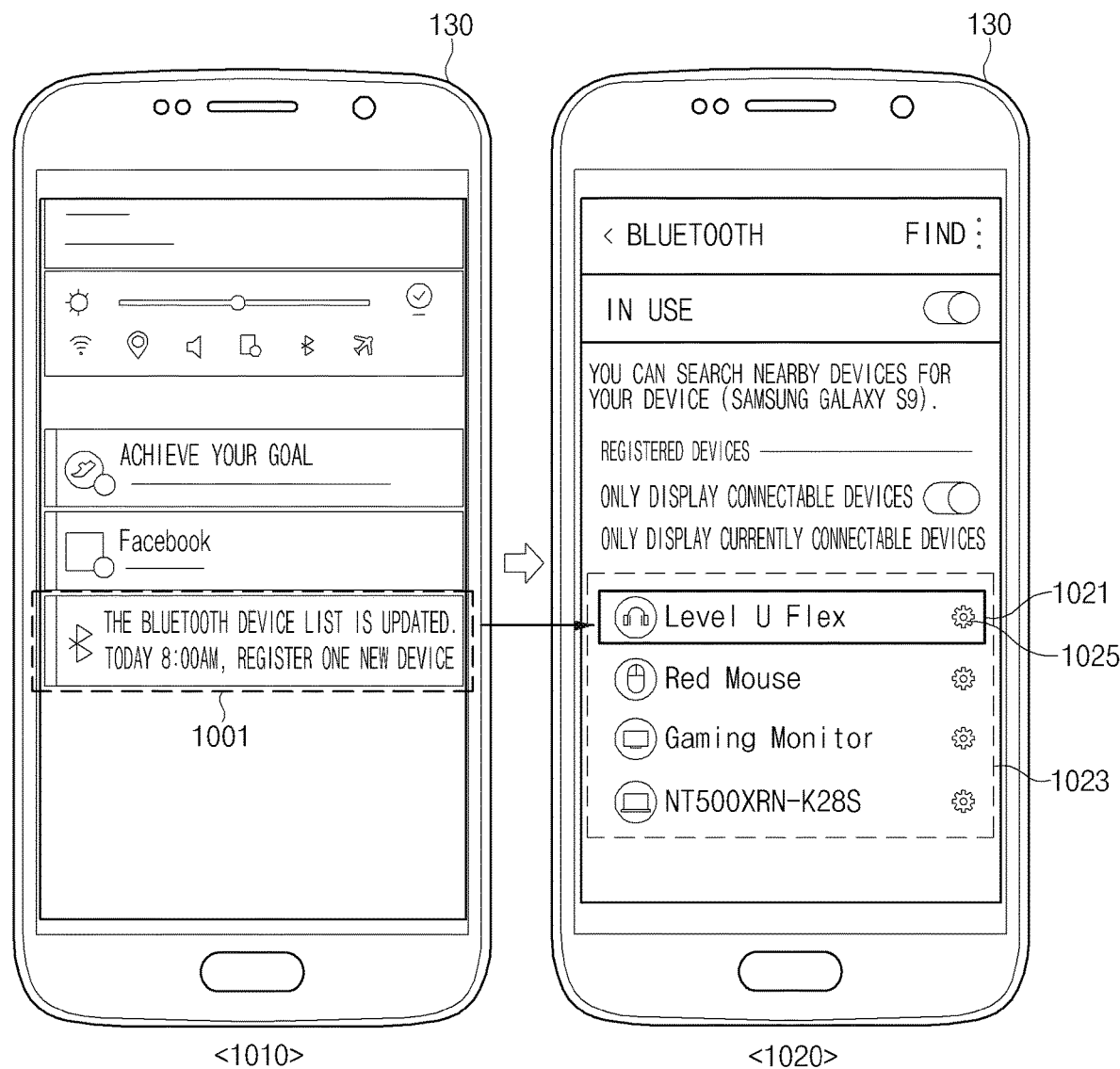
FIG. 10 is a drawing illustrating a UI screen for guiding a user to update registered device information at a second external electronic device according to an embodiment.

FIG. 10 is a drawing illustrating a UI screen for guiding a user to update registered device information at a second external electronic device according to an embodiment.

Referring to FIG. 10, a second external electronic device 130 (e.g., the second external electronic device 130 of FIG. 3) may receive first information about a first external electronic device (e.g., the first external electronic device 120 of FIG. 1B) from an electronic device (e.g., the electronic device 110 of FIG. 2) or an external server (e.g., the external server 400 of FIG. 9) and may output screens for notifying the user of the received first information about the first external electronic device 120.

In reference numeral 1010, when receiving the first information about the first external electronic device 120 and second information about a probability that the first external electronic device 120 will accept a connection request from the external server 400, the second external electronic device 130 may output a notification bar 1001 for notifying the user that registered device information is updated.

In reference numeral 1020, the second external electronic device 130 may display registered device information 1023 including first information 1021 about the first external electronic device 120, received from the electronic device 110, based on an input associated with selecting the notification bar 1001. An icon 1025 for displaying a detailed setting screen of BT communication of each electronic device may be further included in the periphery of first information of each electronic device (e.g., the first information about the first external electronic device 120), included in the registered device information 1023.

Figure 11A:
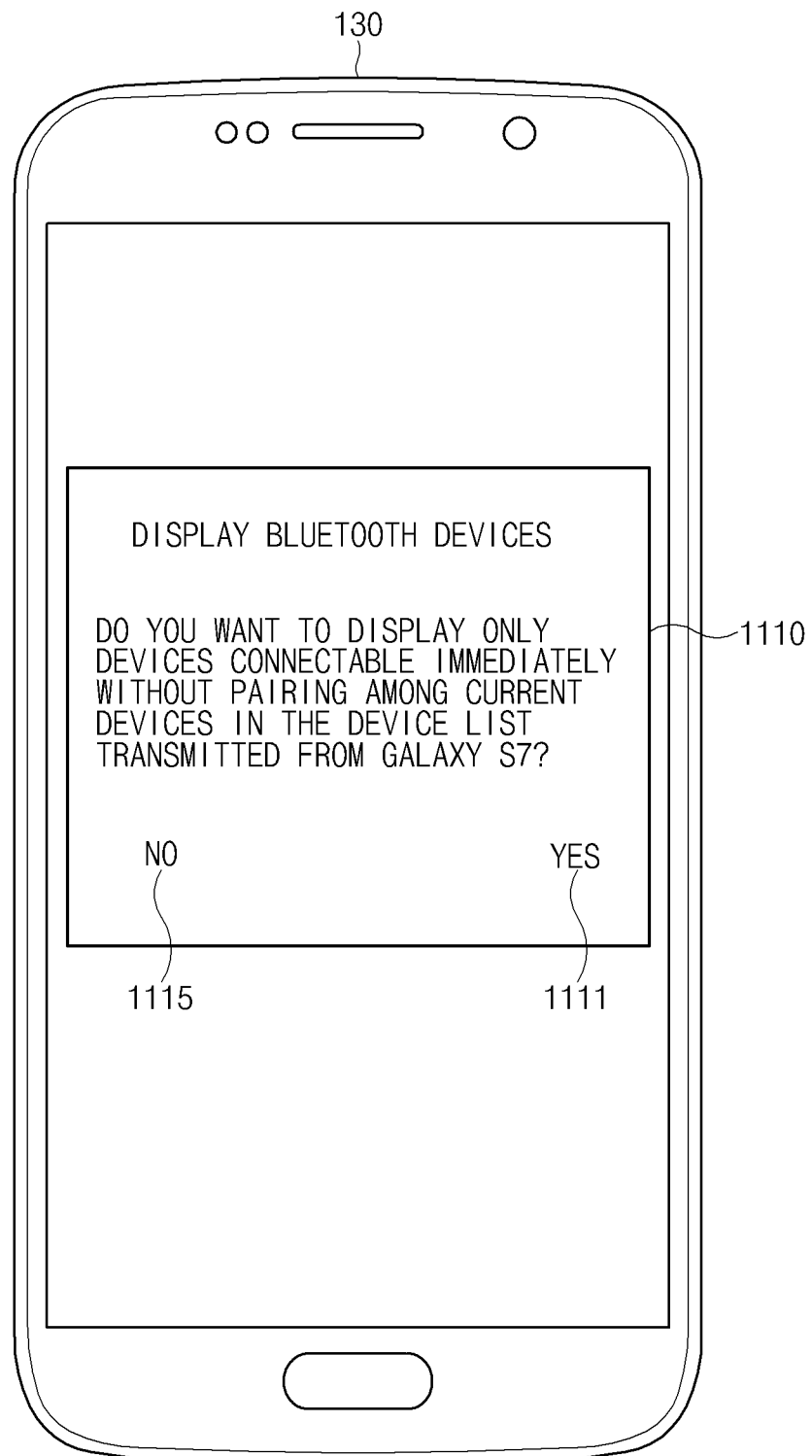
FIGS. 11A and 11B are drawings illustrating UI screens for selecting a display scheme of registered device information according to an embodiment.
Figure 11B:
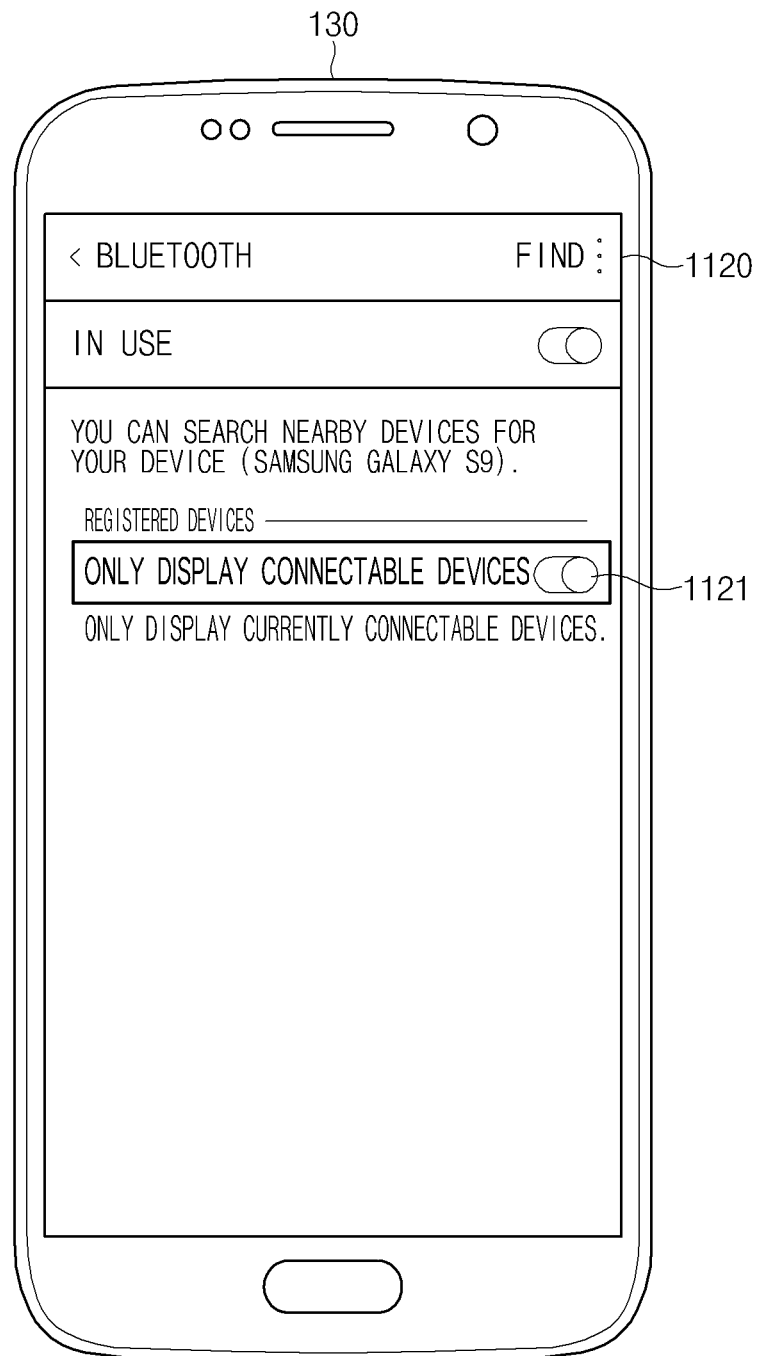

FIGS. 11A and 11B are drawings illustrating UI screens for selecting a display scheme of registered device information according to an embodiment.

Referring to FIGS. 11A and 11B, when receiving registered device information, a second external electronic device 130 may output a UI screen (e.g., a UI screen 1110) for inquiring about the manner for which the received registered device information is displayed.

Referring to FIG. 11A, for example, when receiving registered device information from an electronic device (e.g., the electronic device 110 of FIG. 2), the second external electronic device 130 (e.g., the second external electronic device 130 of FIG. 2) may output the UI screen 1110 for inquiring about the manner for which the registered device information is displayed. On the UI screen 1110, the second external electronic device 130 may display a first virtual button 1111 for selecting a first mode for displaying only first information about the second type of first external electronic devices and a second virtual button 1115 for selecting a second mode for displaying all of first information of the first external electronic devices. The second type of first external electronic devices may be those capable of establishing a BT communication connection based on an address for which there is no connection history. All the types of first external electronic devices may include, for example, the first type of first external electronic devices which are currently connected through BT communication and the third type of first external electronic device incapable of establishing a BT communication connection based on an address for which there is no connection history, in addition to the second type of first external electronic devices. When displaying the first information about all the types of first external electronic devices, the second external electronic device 130 may separately display the first to third types.

Referring to FIG. 11B, the second external electronic device 130 (e.g., the second external electronic device 130 of FIG. 3) may display, for example, a virtual button 1121 for selecting a mode (e.g., the first mode or the second mode) for displaying at least one external electronic device in the registered device information on a UI screen 1120.

Figure 12A:
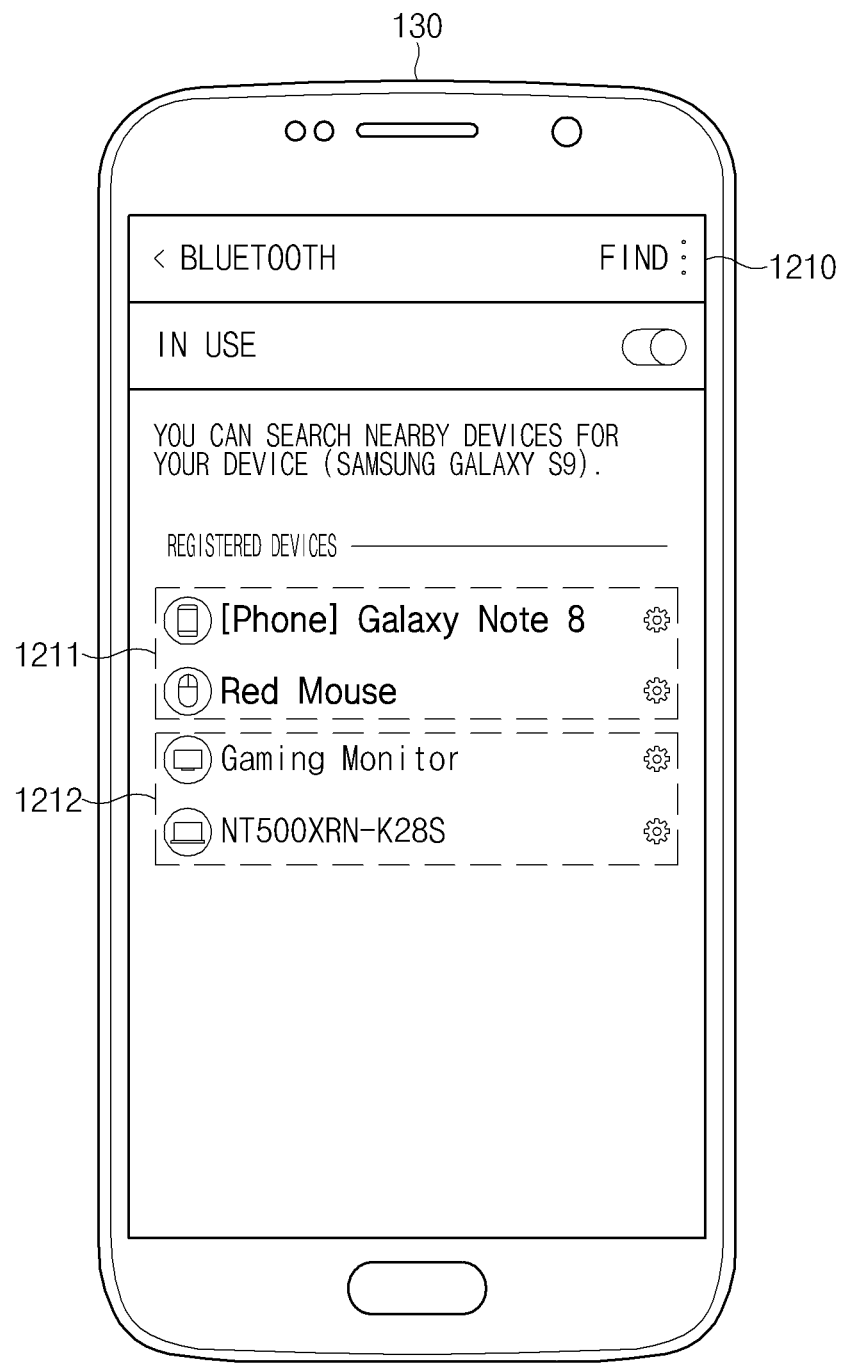
FIGS. 12A and 12B are drawings illustrating examples of displaying registered device information according to an embodiment.
Figure 12B:
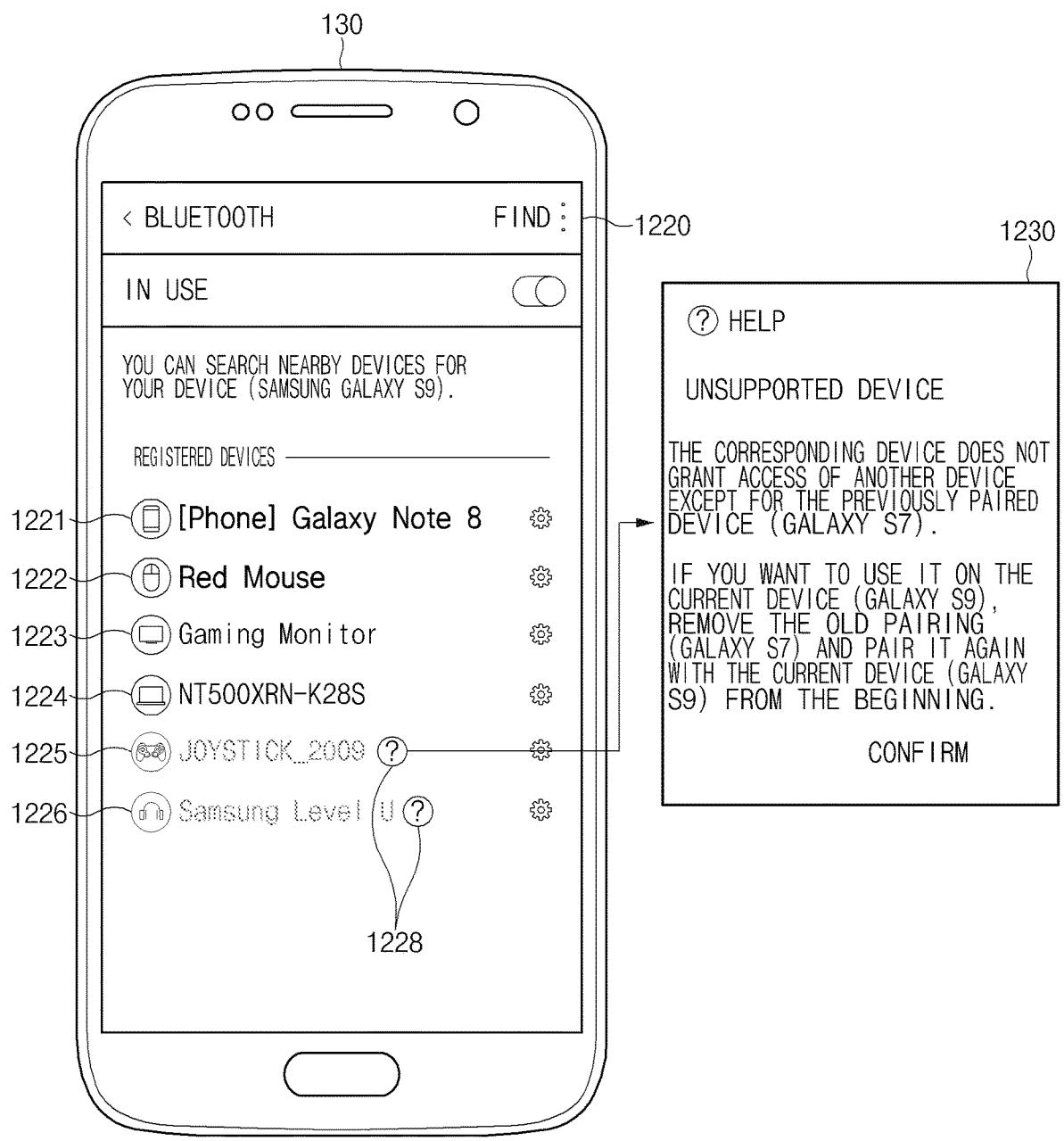

FIGS. 12A and 12B are drawings illustrating examples of displaying registered device information according to an embodiment.

Referring to FIG. 12A, a second external electronic device 130 may display only first information about the first type of first external electronic device and the second type of first external electronic device in received registered device information. For example, when a first virtual button 1111 is selected in FIG. 11A, the second external electronic device 130 may display only the first information about the first type of first external electronic devices (e.g., the devices which are currently connected through BT communication) and the first information about the second type of first external electronic devices (e.g., the devices capable of establishing a BT communication connection based on an address for which there is no connection history). On screen 1210, the second external electronic device 130 may display, for example, first information 1211 about the first type of first external electronic device in letters of a first thickness, and may display first information 1212 about the second type of first external electronic device in letters of a second thickness less than the first thickness. In another example, the second external electronic device 130 may display the first information 1211 about the first type of first external electronic device and the first information 1212 about the second type of first external electronic device separately in different colors.

Referring to FIG. 12B, the second external electronic device 130 may display all types of first external electronic devices included in the received registered device information on a screen 1220. For example, when the first virtual button 1111 is selected in FIG. 11A, the second external electronic device 130 may display all types of first external electronic devices included in the received registered device information. Furthermore, the second external electronic device 130 may display an icon 1228 for notifying the user of additional information on the periphery of registered device information and may display a sentence 1230 for notifying the user of characteristics of the first external electronic device 120 selected based on the selection of the icon 1228 on the screen 1220.

On the screen 1220, the second external electronic device 130 may display first information 1221 and 1222 about the first type of first external electronic device which is currently connected through BT communication in a first color (e.g., blue), may display first information 1223 and 1224 about the second type of first external electronic device capable of establishing a BT communication connection based on an address for which there is no connection history in a second color (e.g., black), and may display first information 1225 and 1226 about the third type of first external electronic device incapable of establishing a BT communication connection based on an address for which there is no connection history in a third color (e.g., gray).

Additionally or alternatively, the second external electronic device 130 may display an icon 1228 for describing characteristics of the third type of first external electronic device on the periphery of first information about the third type of first external electronic device. When the icon 1228 is selected, the second external electronic device 130 may display a sentence 1230 for notifying a user of characteristics of the third type of first external electronic device on at least a part of the screen 1220. For example, the sentence 1230 may include a guide on how to establish a BT communication connection to the third type of first external electronic device, i.e. using conventional connection procedures.

Figure 13:
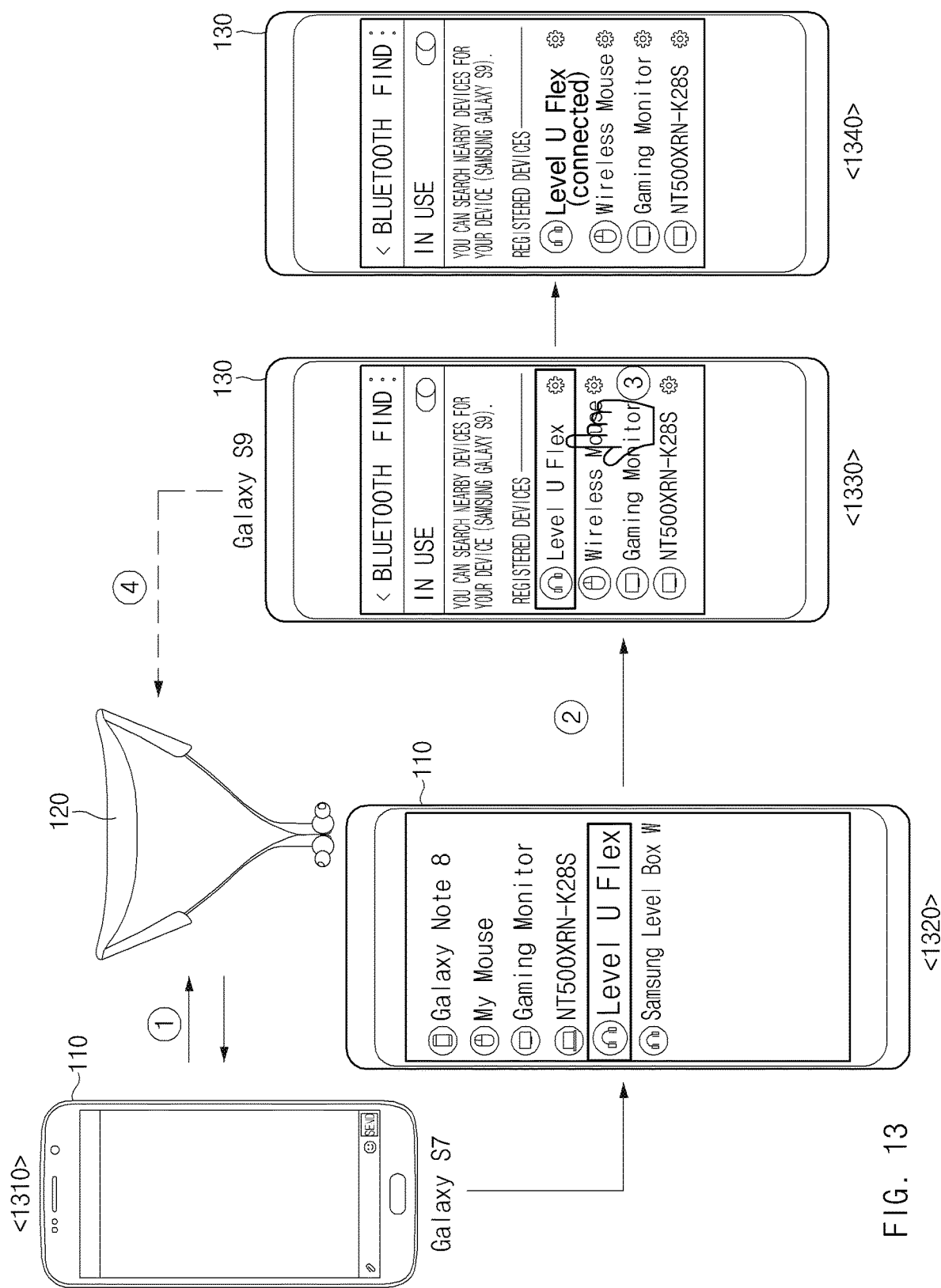
FIG. 13 is a drawing illustrating UI screens for sharing and using registered device information according to an embodiment.

FIG. 13 is a drawing illustrating UI screens for sharing and using registered device information according to an embodiment.

Referring to FIG. 13, an electronic device 110 may establish BT communication with a first external electronic device 120 and may share first information (registered device information) about the first external electronic device 120 and second information about a probability that the first external electronic device 120 will accept a connection request based on a BT address for which there is no connection history with a second external electronic device 130. The second external electronic device 130 may establish a communication connection with the first external electronic device 120 based on the first information about the first external electronic device 120 and the second information about the probability.

In reference numeral 1310, the electronic device (e.g., the electronic device 110 of FIG. 2) may establish a communication connection based on a first BT address with the first external electronic device (e.g., the first external electronic device 120 of FIG. 1B) (step ①). As a result, the electronic device 110 may store first information about the first external electronic device 120 (the BT address and/or the name (e.g., level U Flex) of the first external electronic device 120) in a memory (e.g., a memory 230 of FIG. 2). The electronic device 110 may transmit a communication connection request based on a second BT address to the first external electronic device 120 and may associate and store the second information about the probability of accepting the communication connection request with the first information about the first external electronic device 120 in the memory 230. The second information about the probability that the first external electronic device 120 will accept the communication connection request may include information indicating whether the first external electronic device 120 accepts the communication connection request based on the second BT address for which there is no connection history.

In reference numeral 1320, the electronic device 110 may transmit (share) the second information about the probability of accepting the communication connection request and the first information about the first external electronic device 120 to the second external electronic device 130 (step ②).

In reference numeral 1330, the second external electronic device 130 may display registered device information stored in its memory and may identify an input associated with a communication connection with the first external electronic device 120 in the registered device information (step ③). The second external electronic device 130 may establish a communication connection with the first external electronic device 120 based on a BT address of the second external electronic device 130 depending on the identified input associated with the communication connection (④).

In reference numeral 1340, the second external electronic device 130 may display registered device information indicating that it established the communication connection with the first external electronic device 120.

When the communication connection is established with the first external electronic device 120, the second external electronic device 130 may download and install an app associated with the first external electronic device 120 from an external server. For example, the app associated with the first external electronic device 120 may include an app for a parameter setting (e.g., a detailed setting) associated with BT communication of the first external electronic device 120. According to another embodiment, when receiving registered device information associated with the first external electronic device 120 from the electronic device 110, the second external electronic device 130 may receive information associated with the app associated with the first external electronic device 120 from the electronic device 110 or may download the information about the app from the external server.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to an embodiment, an electronic device (e.g., an electronic device 110 of FIG. 1B) may include a user interface (e.g., a user interface 210 of FIG. 2), a communication circuitry (e.g., a communication circuitry 220 of FIG. 2) configured to support Bluetooth (BT) communication and to store a first BT address, a processor (e.g., a processor 240 of FIG. 2) operatively connected with the user interface and the communication circuitry, and a memory operatively connected with the processor. The memory may store instructions that, when executed, cause the processor to establish a communication connection with a first external electronic device (e.g., a first external electronic device 120 of FIG. 1A) based on the first BT address, using the communication circuitry, end the communication connection with the first external electronic device, receive a reconnection request based on the first BT address from the first external electronic device after ending the communication connection, transmit a communication connection request to the first external electronic device based on a second BT address different from the first BT address, using the communication circuitry in response to the reconnection request, and store information about whether the first external electronic device accepts or declines the communication connection request in the memory.

The instructions may cause the processor to transmit the stored information to a second external electronic device (e.g., a second external electronic device 130 of FIG. 1B).

The instructions may cause the processor to associate and store additional information about the first external electronic device with the information about the first external electronic device accepts or declines the communication connection request. The additional information may be obtained in a communication connection process based on the first BT address.

The instructions may cause the processor to identify whether the first external electronic device accepts or declines the communication connection request, based on the information about whether the first external electronic device accepts or declines the communication connection request, transmit the additional information about the first external electronic device to a second external electronic device using the communication circuitry, when it is identified that the first external electronic device accepts the communication connection request, and may refrain from transmitting the additional information about the first external electronic device to the second external electronic device, when it is identified that the first external electronic device declines the communication connection request.

The instructions may cause the processor to establish another communication connection based on the first BT address with the first external electronic device, after storing the information about whether the first external electronic device accepts or declines the communication connection request.

The instructions may cause the processor to receive another reconnection request based on the first BT address from the first external electronic device, after storing the information in the memory, and establish the other communication connection with the first external electronic device based on the first BT address, in response to the other reconnection request based on the first BT address.

The information may include information indicating whether the first external electronic device accepts or declines the communication connection request, when the first external electronic device is not in a pairing mode.

The first BT address may be a unique address of the electronic device, and the second BT address may be an address for which there is no history of established communication connections with the first external electronic device.

The instructions may cause the processor to, when transmission of the stored information to the second external electronic device is completed, stop a scan of the first external electronic device when a specified time interval has not elapsed from when the stored information is transmitted or when the electronic device is within a specified distance of the second external electronic device.

According to an embodiment, an electronic device (e.g., a second external electronic device 130 of FIG. 3) may include a user interface (e.g., a user interface 310 of FIG. 3), at least one communication circuitry (e.g., a communication circuitry 320 of FIG. 3) configured to support Bluetooth (BT) communication, a processor (e.g., a processor 340 of FIG. 3) operatively connected with the user interface and the at least one communication circuitry, and a memory (e.g., a memory 330 of FIG. 3) operatively connected with the processor. The memory may include instructions that, when executed, cause the processor to receive first information about at least one second external electronic device (e.g., a first external electronic device 120 of FIG. 1B) with which a first external electronic device (e.g., an electronic device 110 of FIG. 1B) is connected through BT communication and second information about a probability that the at least one second external electronic device will accept a connection request using an address for which there is no connection history, using the at least one communication circuitry, and provide the second information through the user interface.

The instructions may cause the processor to associate the second information with the first information and provide the second information and the first information through the user interface.

The first external electronic device and the electronic device may be configured with the same user account.

The instructions may cause the processor to provide a user interface element for selecting to store the first information and the second information through the user interface and store the first information and the second information in the memory based on a selection of the user interface element.

The instructions may cause the processor to receive the first information and the second information from the first external electronic device or a server.

The instructions may cause the processor to install an app associated with the at least one second external electronic device based on the first information.

According to an embodiment, an electronic device (e.g., an electronic device 110 of FIG. 2) may include a user interface (e.g., a user interface 210 of FIG. 2), a communication circuitry (e.g., a communication circuitry 220 of FIG. 2) configured to support Bluetooth (BT) communication and to store a first BT address, a processor (e.g., a processor 240 of FIG. 2) operatively connected with the user interface and the communication circuitry, and a memory (e.g., a memory 230 of FIG. 2) operatively connected with the processor. The memory may store instructions that, when executed, cause the processor to establish a communication connection with a first external electronic device (e.g., a first external electronic device 120 of FIG. 1B) based on the first BT address, using the communication circuitry, transmit a communication connection request to the first external electronic device based on a second BT address different from the first BT address, using the communication circuitry, after the communication connection is established, and store information about whether the first external electronic device accepts or declines the communication connection request based on the second BT address in the memory.

The instructions may cause the processor to transmit the stored information to a second external electronic device (e.g., a second external electronic device 130 of FIG. 1B).

The instructions may cause the processor to associate and store the information about whether the first external electronic device accepts or declines the communication connection request with additional information about the first external electronic device, the additional information being obtained in a communication connection process based on the first BT address.

The instructions may cause the processor to identify whether the first external electronic device accepts or declines the communication connection request, based on the information about whether the first external electronic device accepts or declines the communication connection request, transmit the additional information about the first external electronic device to a second external electronic device using the communication circuitry, when it is identified that the first external electronic device accepts the communication connection request, and refrain from transmitting the additional information about the first external electronic device to the second external electronic device, when it is identified that the first external electronic device declines the communication connection request.

The first BT address may be a unique address of the electronic device, and the second BT address may be an address for which there is no history of established communication connections with the first external electronic device.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1440) including one or more instructions that are stored in a storage medium (e.g., internal memory 1436 or external memory 1438) that is readable by a machine (e.g., the electronic device 1401). For example, a processor (e.g., the processor 1420) of the machine (e.g., the electronic device 1401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to certain embodiments disclosed in the present disclosure, the electronic device may configure BT communication information including information indicating whether it is possible for an external electronic device to establish BT communication based on a BT address for which there is no history of establishing the BT communication. In addition, various effects directly or indirectly ascertained through the present disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device, comprising:
a user interface;
a communication circuitry configured to support Bluetooth (BT) communication and to store a first BT address;
a processor operatively connected with the user interface and the communication circuitry; and
a memory operatively connected with the processor,
wherein the memory stores instructions that, when executed, cause the processor to:
establish a communication connection with a first external electronic device based on the first BT address, using the communication circuitry;
end the communication connection with the first external electronic device;
receive a reconnection request based on the first BT address from the first external electronic device, after ending the communication connection;
transmit a communication connection request to the first external electronic device based on a second BT address different from the first BT address, using the communication circuitry in response to the reconnection request; and
store information about whether the first external electronic device accepts or declines the communication connection request in the memory.

2. The electronic device of claim 1, wherein the instructions further cause the processor to transmit the stored information to a second external electronic device.

3. The electronic device of claim 2, wherein the instructions further cause the processor to:
when transmission of the stored information to the second external electronic device is completed, stop a scan of the first external electronic device when a specified time interval has not elapsed from when the stored information is transmitted or when the electronic device is within a specified distance of the second external electronic device.

4. The electronic device of claim 1, wherein the instructions further cause the processor to associate and store additional information about the first external electronic device with the information about the first external electronic device accepts or declines the communication connection request, and wherein the additional information is obtained in a communication connection process based on the first BT address.

5. The electronic device of claim 4, wherein the instructions further cause the processor to:

identify whether the first external electronic device accepts or declines the communication connection request, based on the information about whether the first external electronic device accepts or declines the communication connection request;

transmit the additional information about the first external electronic device to a second external electronic device using the communication circuitry, when it is identified that the first external electronic device accepts the communication connection request; and refrain from transmitting the additional information about the first external electronic device to the second external electronic device, when it is identified that the first external electronic device declines the communication connection request.

6. The electronic device of claim 1, wherein the instructions further cause the processor to establish another communication connection based on the first BT address with the first external electronic device, after storing the information about whether the first external electronic device accepts or declines the communication connection request.

7. The electronic device of claim 6, wherein the instructions further cause the processor to:

receive another reconnection request based on the first BT address from the first external electronic device, after storing the information in the memory; and establish the other communication connection with the first external electronic device based on the first BT address, in response to the other reconnection request based on the first BT address.

8. The electronic device of claim 1, wherein the information includes information indicating whether the first external electronic device accepts or declines the communication connection request, when the first external electronic device is not in a pairing mode.

9. The electronic device of claim 1, wherein the first BT address is a unique address of the electronic device, and wherein the second BT address is an address for which there is no history of established communication connections with the first external electronic device.

10. An electronic device, comprising:
a user interface;
a communication circuitry configured to support Bluetooth (BT) communication and to store a first BT address;
a processor operatively connected with the user interface and the communication circuitry; and
a memory operatively connected with the processor,
wherein the memory stores instructions that, when executed, cause the processor to:
establish a communication connection with a first external electronic device based on the first BT address, using the communication circuitry;
transmit a communication connection request to the first external electronic device based on a second BT address different from the first BT address, using the communication circuitry, after the communication connection is established; and
store information about whether the first external electronic device accepts or declines the communication connection request based on the second BT address in the memory.

11. The electronic device of claim 10, wherein the instructions further cause the processor to transmit the stored information to a second external electronic device.

12. The electronic device of claim 10, wherein the instructions further cause the processor to associate and store the information about whether the first external electronic device accepts or declines the communication connection request with additional information about the first external electronic device, the additional information being obtained in a communication connection process based on the first BT address.

13. The electronic device of claim 12, wherein the instructions further cause the processor to:

identify whether the first external electronic device accepts or declines the communication connection request, based on the information about whether the first external electronic device accepts or declines the communication connection request;

transmit the additional information about the first external electronic device to a second external electronic device using the communication circuitry, when it is identified that the first external electronic device accepts the communication connection request; and refrain from transmitting the additional information about the first external electronic device to the second external electronic device, when it is identified that the first external electronic device declines the communication connection request.

14. The electronic device of claim 10, wherein the first BT address is a unique address of the electronic device, and wherein the second BT address is an address for which there is no history of established communication connections with the first external electronic device.

* * * * *